(12) United States Patent
Keating et al.

(10) Patent No.: US 10,189,187 B2
(45) Date of Patent: Jan. 29, 2019

(54) METHODS AND APPARATUS FOR COMPUTER-ASSISTED SPRAY FOAM FABRICATION

(71) Applicant: Massachusetts Institute of Technology, Cambridge, MA (US)

(72) Inventors: Steven Keating, Sunnyvale, CA (US); Neri Oxman, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 218 days.

(21) Appl. No.: 15/393,751

(22) Filed: Dec. 29, 2016

(65) Prior Publication Data
US 2017/0106592 A1  Apr. 20, 2017

Related U.S. Application Data

(63) Continuation of application No. 13/856,407, filed on Apr. 3, 2013, now Pat. No. 9,566,742.
(Continued)

(51) Int. Cl.
*B05B 13/04*  (2006.01)
*B29C 33/38*  (2006.01)
(Continued)

(52) U.S. Cl.
CPC ...... *B29C 33/3842* (2013.01); *B05B 13/0431* (2013.01); *B28B 7/346* (2013.01);
(Continued)

(58) Field of Classification Search
CPC ............ B29C 33/3842; B29C 67/0059; B29C 67/0055; B29C 2793/009; B05B 13/0421; B05B 13/0431
(Continued)

(56) References Cited

U.S. PATENT DOCUMENTS 3,668,287 A  6/1972 Mackie
3,897,298 A  7/1975 Gray
(Continued)

FOREIGN PATENT DOCUMENTS

GB   2046339 A   11/1980
WO   2011021080 A2   2/2011

OTHER PUBLICATIONS

Khoshnevis, B., Bekey, G., 2002, Automated Construction using Contour Crafting—Applications on Earth and Beyond, NIST SP 989; Sep. 2002., Proceedings of International Symposium on Automation and Robotics in Construction, 19th (ISARC). pp. 489-494.
(Continued)

*Primary Examiner* — Atul P. Khare
(74) *Attorney, Agent, or Firm* — Stephen R. Otis

(57) ABSTRACT

In exemplary implementations of this invention, a nozzle sprays foam, layer by layer, to fabricate a fabricated object according to a CAD model, and a subtractive fabrication tool removes material from the fabricated object according to a CAD model. The fabricated object comprises a mold or an interior form. The foam may be low-density, high strength and fast-curing. The foam may be used for large-scale 3D printing. For example, the foam may be used to 3D print molds for walls of homes. The foam molds may be left in place, after casting concrete in the molds, to serve as insulation. Or for example, the foam may be used to 3D print on site an internal form for a large wind turbine blade. The wind turbine blade may then be produced on site by depositing fiberglass on the outside of the internal form.

18 Claims, 19 Drawing Sheets

Related U.S. Application Data

(60) Provisional application No. 61/619,825, filed on Apr. 3, 2012.

(51) Int. Cl.

| | |
|---|---|
| *B33Y 30/00* | (2015.01) |
| *B29C 64/188* | (2017.01) |
| *B29C 64/209* | (2017.01) |
| *B29C 64/227* | (2017.01) |
| *B29C 44/12* | (2006.01) |
| *E04B 1/16* | (2006.01) |
| *B28D 1/18* | (2006.01) |
| *E04G 21/18* | (2006.01) |
| *G01S 5/00* | (2006.01) |
| *B28B 7/34* | (2006.01) |
| *B28B 19/00* | (2006.01) |
| *B33Y 10/00* | (2015.01) |
| *E04G 9/05* | (2006.01) |
| *E04G 9/10* | (2006.01) |
| *E04G 21/04* | (2006.01) |
| *E04C 5/16* | (2006.01) |
| *B29C 64/106* | (2017.01) |
| *B29C 64/112* | (2017.01) |
| *E04G 11/06* | (2006.01) |
| *B29K 105/04* | (2006.01) |
| *E04B 2/86* | (2006.01) |
| *B29K 75/00* | (2006.01) |
| *B29L 31/00* | (2006.01) |
| *B29L 31/30* | (2006.01) |

(52) U.S. Cl.
CPC .......... *B28B 7/348* (2013.01); *B28B 19/003* (2013.01); *B28B 19/0046* (2013.01); *B28D 1/18* (2013.01); *B29C 44/1271* (2013.01); *B29C 64/106* (2017.08); *B29C 64/112* (2017.08); *B29C 64/188* (2017.08); *B29C 64/209* (2017.08); *B29C 64/227* (2017.08); *B33Y 10/00* (2014.12); *B33Y 30/00* (2014.12); *E04B 1/167* (2013.01); *E04C 5/168* (2013.01); *E04G 9/05* (2013.01); *E04G 9/10* (2013.01); *E04G 21/0418* (2013.01); *E04G 21/185* (2013.01); *G01S 5/00* (2013.01); *B29C 2033/385* (2013.01); *B29C 2793/009* (2013.01); *B29K 2075/00* (2013.01); *B29K 2105/04* (2013.01); *B29L 2031/307* (2013.01); *B29L 2031/3082* (2013.01); *B29L 2031/757* (2013.01); *E04B 1/161* (2013.01); *E04B 2/8617* (2013.01); *E04G 21/0436* (2013.01); *E04G 21/0463* (2013.01); *Y10T 428/24628* (2015.01)

(58) Field of Classification Search
USPC ..... 264/219, 220, 401, 31, 33, 34, 162, 250, 264/308, 344
See application file for complete search history.

(56) References Cited

U.S. PATENT DOCUMENTS

| | | | |
|---|---|---|---|
| 3,914,077 A | 10/1975 | Lodes | |
| 4,077,177 A | 3/1978 | Boothroyd et al. | |
| 4,167,151 A | 9/1979 | Muraoka et al. | |
| 5,443,313 A | 8/1995 | Fridman | |
| 5,555,176 A | 9/1996 | Menhennett et al. | |
| 5,572,431 A | 11/1996 | Brown et al. | |
| 5,590,454 A | 1/1997 | Richardson | |
| 6,021,358 A | 2/2000 | Sachs | |
| 6,375,880 B1 | 4/2002 | Cooper et al. | |
| 6,616,885 B2 | 9/2003 | Lombardi et al. | |
| 6,782,303 B1 | 8/2004 | Fong | |
| 7,070,120 B2 | 7/2006 | Cowelchuck et al. | |
| 7,452,196 B2 | 11/2008 | Khoshnevis | |
| 7,641,461 B2 | 1/2010 | Khoshnevis | |
| 7,767,014 B2 | 8/2010 | Strauss | |
| 7,837,378 B2 | 11/2010 | Khoshnevis | |
| 8,017,048 B1 | 9/2011 | Carter et al. | |
| 8,029,258 B2 | 10/2011 | Khoshnevis | |
| 8,252,223 B2 | 8/2012 | Medina et al. | |
| 8,337,736 B2 | 12/2012 | Dini | |
| 2002/0112442 A1 | 8/2002 | Sperber | |
| 2009/0107065 A1 | 4/2009 | LeBlang | |
| 2010/0058700 A1 | 3/2010 | LeBlang | |
| 2011/0138724 A1 | 6/2011 | Olang | |

OTHER PUBLICATIONS

Lim, S., Buswell, R., Le, T., Austin, S., Gibb, A. Thorpe, T., 2012, Developments in construction-scale additive manufacturing processes. Automation in Construction, vol. 21, Jan. 2012, pp. 262-268, Elsevier.

Bechthold, M., 2010, The Return of the Future: A Second Go at Robotic Construction. Architectural Design Special Issue: The New Structuralism: Design, Engineering and Architectural Technologies vol. 80, Issue 4, pp. 116-121, Jul./Aug. 2010, John Wiley & Sons, Ltd.

Buswell, R., Soar, R., Gibb, A. Thorpe, A., 2007, Freeform Construction: Mega-Scale Rapid Manufacturing for construction. Automation in Construction, vol. 16, Issue 2, Mar. 2007, pp. 224-231, Elsevier.

Buswell, R., Gibb, A., Soar, R. Austin, S., Thorpe, A., 2007, Applying future industrialised processes to construction. CIB2007-193, Proceedings of CIB World Building Congress 'Construction for Development' 2007.

Petersen, K., Nagpal, R., Werfel, J., 2011, TERMES: An Autonomous Robotic System for Three-Dimensional Collective Construction. Proceedings of Robotics: Science and Systems, 2011.

Pandremenos, J., Doukas, C., Stavropoulos, P., Chryssolouris, G., 2011, Machining with Robots: A critical Review. Proceedings of DET2011, 7th International Conference on Digital Enterprise Technology, 2011.

Walters, R., 2011, Real life "Constructicon" quadcopter robots being developed. ExtremeTech.com, article, Dec. 2, 2011, http://www.extremetech.com/extreme/107217-real-life-constructicon-quadcopter-robots-being-developed (accessed on Apr. 21, 2013).

Vosniakos, G., et al., Improving feasibility of robotic milling through robot placement optimisation; published in Robotics and Computer-Integrated Manufacturing, vol. 26, Issue 5, Oct. 2010, pp. 517-525.

Posthuma, A., Development of a Novel Robotically Effected Plastic Foam Sculpting System for Rapid Prototyping and Manufacturing; published as Masters Thesis, Dept. of Mechanical Engineering, University of Canterbury (2007).

Khoshnevis, B., Automated construction by contour crafting—related robotics and information technologies; published in Automation in Construction, Special Issue: The best of ISARC 2002, vol. 13, Issue 1, Jan. 2004, pp. 5-19.

Brooks, H., et al., A review of state-of-the-art large-sized foam cutting rapid prototyping and manufacturing technologies; published in Rapid Prototyping Journal, vol. 16 Issue 5, pp. 318-327 ( 2010).

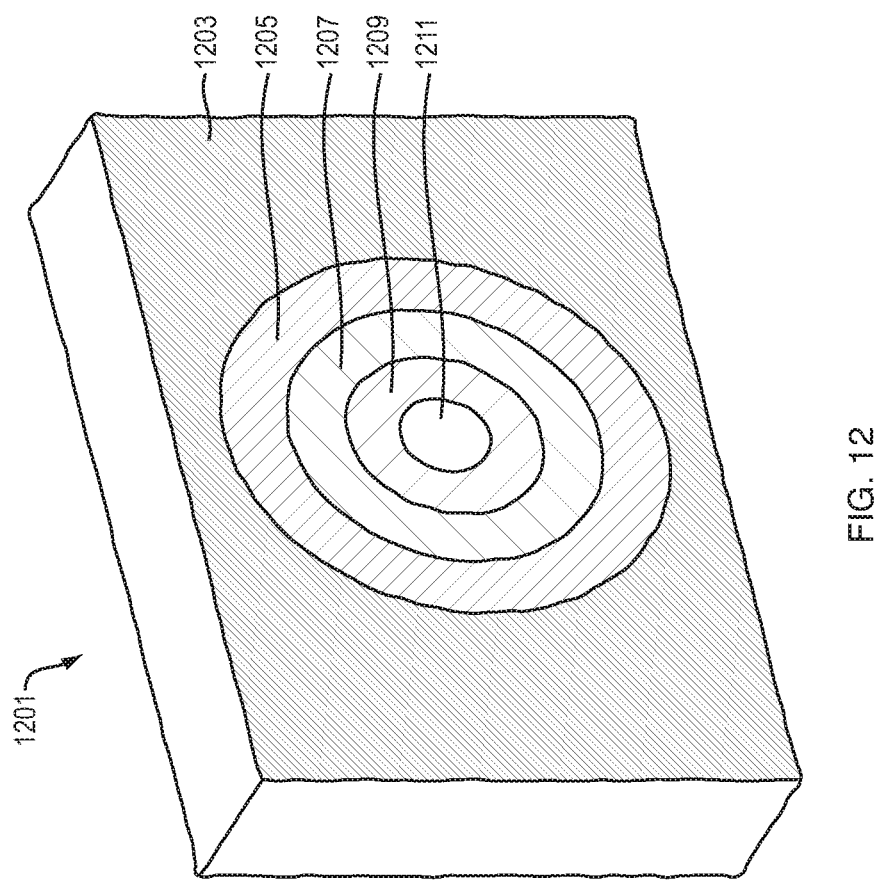

METHODS AND APPARATUS FOR COMPUTER-ASSISTED SPRAY FOAM FABRICATION

RELATED APPLICATIONS

This application is a continuation of U.S. application Ser. No. 13/856,407 filed Apr. 3, 2013 (the "407 Application"), which claims the benefit of U.S. Provisional Application No. 61/619,825 filed Apr. 3, 2012 (the "825 Application"). The entire disclosures of the 407 Application and the 825 Application are herein incorporated by reference.

STATEMENT REGARDING FEDERALLY SPONSORED RESEARCH OR DEVELOPMENT

This invention was made with U.S. government support under Grant Number CMMI-1152550, awarded by the National Science Foundation. The government has certain rights in this invention.

FIELD OF THE TECHNOLOGY

The present invention relates generally to foam.

SUMMARY

In exemplary implementations of this invention, a nozzle sprays foam, layer by layer, to fabricate a fabricated object according to a CAD model, and a subtractive fabrication tool removes material from the fabricated object according to a CAD model. The fabricated object comprises a mold or an interior form.

The foam may be low-density, high strength and fast-curing.

The foam may be used for large-scale 3D printing. For example, the foam may be used to 3D print molds for walls of homes. The foam molds may be left in place, after casting concrete in the molds, to serve as insulation. Or for example, the foam may be used to 3D print on site an internal form for a large wind turbine blade. The wind turbine blade may then be produced on site by depositing fiberglass on the outside of the internal form.

The foam may be sprayed in any direction, including vertically up, at an angle that is partially up, or at a purely horizontal angle. By doing so, foam structures may be fabricated with overhangs or with unsupported horizontal spans that do not have support material directly underneath. The foam spraying may create objects that have closed voids, internal features or doubly curving walls. The foam itself need not be sprayed into a mold or other confined space.

Further, the mold or internal form (or structural material cast into the mold) may have spatially-varying material properties. For example, the walls of a foam mold may have an opacity gradient (varying spatially from opaque to various degrees of translucency to transparent). For example, by 3D printing a foam mold with such an opacity gradient and casting a transparent material inside the mold, a skylight may be fabricated.

The description of the present invention in the Summary and Abstract sections hereof is just a summary. It is intended only to give a general introduction to some illustrative implementations of this invention. It does not describe all of the details of this invention. This invention may be implemented in many other ways.

BRIEF DESCRIPTION OF THE DRAWINGS

In FIG. 6A, the foam chemically cures. In FIG. 6B, the foam thermally sets. In FIG. 6C, the foam optically cures

FIG. 12 shows a foam structure with an opacity gradient.

In FIG. 13A, foam is being sprayed to create the internal form. In FIG. 13B, tape is being wrapped around the exterior of the internal form. The tape includes fiberglass. In FIG. 13C, chopped fibers are being sprayed on the exterior of the internal form.

FIG. 15A is a block diagram of illustrative hardware used in this system. FIG. 15B is a perspective view of an example of this system.

The above Figures show some illustrative implementations of this invention, or provide information that relates to those implementations. However, this invention may be implemented in many other ways. The above Figures do not show all of the details of this invention.

DETAILED DESCRIPTION

In exemplary implementations of this invention, a spray nozzle sprays foam layer by layer to 3D print either (i) a mold for casting or (ii) an internal form. As used herein, an "internal form" is a 3D object that is used for determining a shape of a second object, which second object is produced (or shaped) by depositing material on (or pressing material against) the outside of the internal form.

The foam may be used for large-scale 3D printing. For example, the foam may be used to 3D print molds for walls of large structures (e.g., homes or office buildings). Or for example, the foam may be used to 3D print on site an internal form for a large wind turbine blade. The wind turbine blade may then be produced on site by depositing fiberglass on the outside of the internal form.

The foam may be low-density, high strength, fast-curing and insulative. As used herein: "low-density" means 0.1 PCF to 30 PCF; "high strength" means having a compressive strength in excess of 5 PSI and a shear strength in the range of 5 PSI to 1000 PSI; "fast-curing" means curing or setting within 0-500 seconds after exiting a spray nozzle; and "insulative" means having an R value of at least 3 $ft^{2*\circ}F.*h/(BTU*in)$.

In the case of a mold: A fast-curing mold may be 3D printed with foam. These molds may then be used to cast concrete. This allows the sidestepping of the complexities associated with direct concrete extrusion, for instance cure time, slump issues, and weight of the hopper material. In addition, this allows for a stronger product as the concrete is cast at once instead of successively layered.

As noted above, the foam may be insulative. In that case, after the foam is used as a mold for concrete casting, the mold may be left in place and serve as a thermal insulative layer.

Figure 3:
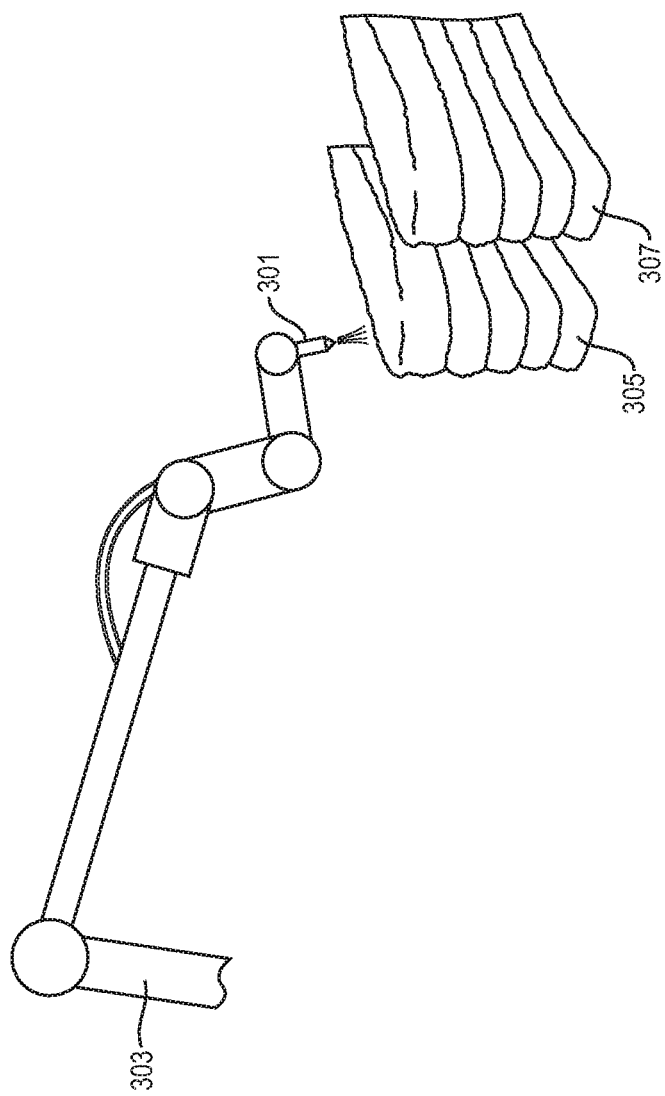
FIG. 3 shows a spray nozzle mounted on a fabricator arm. The nozzle is fabricating an insulative mold.

Separating the mold printing from the concrete pour simplifies construction. A building's mold can be 3D printed and then a concrete truck can do a single pour at a convenient time. As well, the hollow mold can be adjusted for the inclusion of embedded objects (e.g., plumbing, rebar, or electrical wiring) before the concrete is poured (FIG. 3).

A prototype of this invention uses a polyurethane foam (FROTH-PAK® foam, sold by The Dow Chemical Company). The FROTH-PAK® foam is produced by mixing two chemical components. It cures very rapidly: after the two components are mixed, it will skim over within 30-40 seconds and cure completely in minutes. The FROTH-PAK® foam also has the following characteristics at room temperature: (i) minimum R-value (thermal resistance per inch, ASTM C518, $ft^2 \cdot h \cdot F/BTU$) initial: 6.6, aged 90 days at 140° F.: 5.6, (ii) compressive strength, ASTM D1621 $lb/in^2$, parallel: 21.1; (iii) flexural strength, ASTM C203 $lb/in^2$, parallel: 22.7; (iv) tensile strength, ASTM D1623 $lb/in^2$, parallel: 26.7; (v) shear strength, ASTM C273 $lb/in^2$, parallel: 16.7; and (vi) nominal density, ASTM D1622, $lb/ft^3$: 1.75. The FROTH-PAK® foam's rapid cure time allows for a large structure to be printed very quickly. For example, in a prototype of this invention, a curved mold for a twelve foot long wall structure was printed in approximately 5 minutes using a robotic arm to control the nozzle position. It is estimated that molds for an entire house structure could be printed in only a few hours.

A variety of different types of foams may be used. For example, rather than a 2-component polyurethane (PU) foam (such as FROTH-PAK® foam), a 1-component PU foam may be used (although it may cure more slowly than a 2-component PU foam). Alternately, the foam may comprise any of the following materials: polyethylene, PVC, epoxy, or biodegradable polymer foams. Other materials may be included in the foam, including flame retardants, colored dyes, conductive particles (e.g., for sensing or electrical signal/power capacity), fiber reinforcements (e.g., for structural reasons), metallic fibers (e.g. for radiation shields, antenna dishes, or other radiation applications), lubricants (e.g., for easy mold release), or additions to allow high temperature casting.

A compound operation of additive and subtractive fabrication modes can be used. In this approach, an additive fabrication mode is used first. For example, thick layers of foam are sprayed very quickly. The surface of the foam layers will be "low resolution", i.e., rough and uneven. A subtractive fabrication mode is used second. For example, the surface of the foam layers can be milled. The milling smooths the surface of the foam layers, thereby achieving a much higher resolution. If subtractive milling is employed, it is preferable that the foam's pore size be smaller than the desired finish resolution (e.g., less than 5 mm for a large-scale printed structure). The resolution of the subtractively milled foam and thus of the resulting structure depends on the pore size. During fabrication, the additive and subtractive modes may be alternated: for example, spray foam, mill foam, spray more foam, mill more foam, etc.

In many implementations, it is preferable that the foam be low-density. A low-density foam can allow an overhang structure to be 3D printed (whereas higher density materials may not be able to maintain the desired form and shape while curing). Also, a low-density foam can reduce the weight of the materials used to 3D print a given volume. This can be important if a mobile robot that 3D prints with the foam is carrying its own supply of foam ingredients. Also, using a low-density foam can in some cases lower total material cost.

In many implementations, it is preferable that the foam be fast-setting. For example, a fast setting foam can allow an overhang structure to be 3D printed (in an overhang structure, the material needs to cure before sagging and falling off the previous layer). Also, for example, when 3D printing layers, each layer needs to cure before the next is printed. Thus, for a fast build time, a fast-curing foam is preferable. Finally, varying environmental conditions (like wind) can impact the shape of the wet layers, so a fast-curing foam improves robustness.

In many implementations, it is preferable that the foam be high strength. A high strength foam can provide structural support during casting of the filler material. During casting, the filler material exerts a hydrostatic pressure against the foam mold. The foam mold needs to have sufficient compressive strength and shear strength to resist being deformed by this pressure.

In the case of molds for casting, it is generally preferable for the foam to be closed cell to be able to contain the cast material. In the case of internal forms (e.g., for fiber wiping) either open cell or closed cell foams will work.

Preferably, the foam can be sprayed and has an adhesive quality to the "wet" foam to provide adequate layer bonding.

Figure 1:
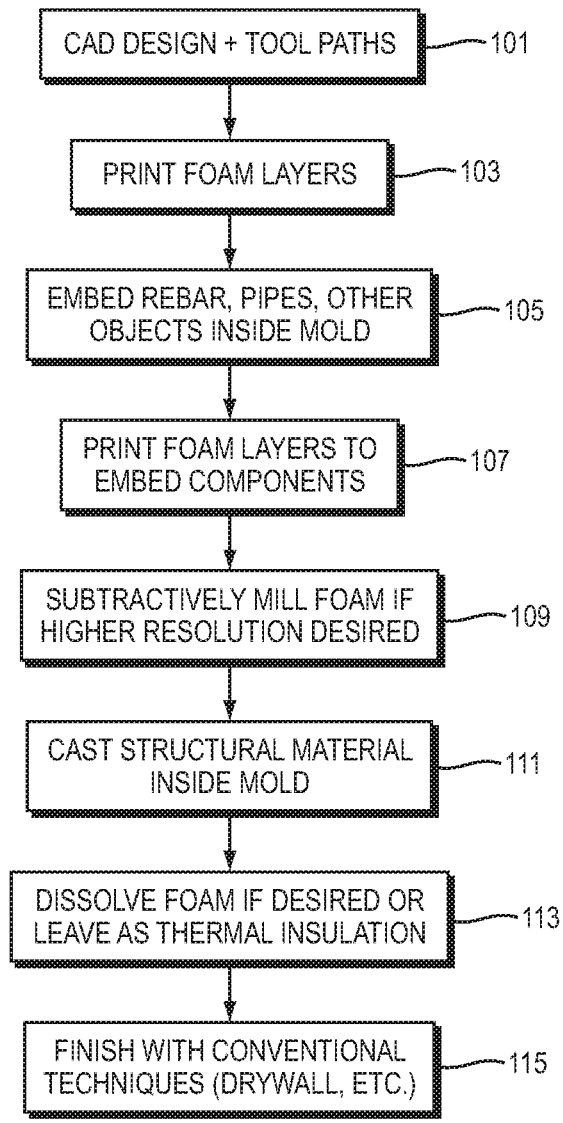
FIG. 1 shows a block diagram of a process for computer-assisted fabrication.

FIG. 1 shows a block diagram of a process for computer-assisted foam layer fabrication and subtractive finishing. First, digital information that includes or is derived from toolpaths or a CAD model is sent to a fabricator. In turn, the fabricator is configured to 3D print an object in accordance with this digital information 101. For example, a 3D design may be created in CAD software, then translated into STL language, and then "sliced" into layers. The layers may be sent to the fabricator that is spraying the foam layers. The fabricator sprays fast-curing foam, layer by layer, each layer in accordance with the digital information 103. Optionally, additional parts can be inserted inside the mold 105 and additional foam sprayed to embed the parts 107. For example, the embedded parts may comprise ties (e.g., to which rebar may be attached), pipes, conduit (e.g., for electrical wiring) or sensors. In order to achieve a higher resolution (i.e., smoother surface of the foam), the foam can be milled 109. Structural material may be cast inside the mold 111. The foam may be removed (e.g., by chemical dissolution, chemical degradation, milling or other mechanical subtractive fabrication) 113. The printed object may finished with conventional techniques (e.g. drywall) 115.

By spraying foam quickly and then milling, faster production times can be achieved for large, high-resolution 3D prints. Furthermore, this additive/subtractive approach can be used to create voids for future doors and windows, by initially filling the voids with foam. Then, after a castable structural material (e.g., concrete or plastic) is cast and cured, the voids are milled out. Alternately, the foam in the voids may be removed by chemical dissolution or chemical degradation.

Figure 2:
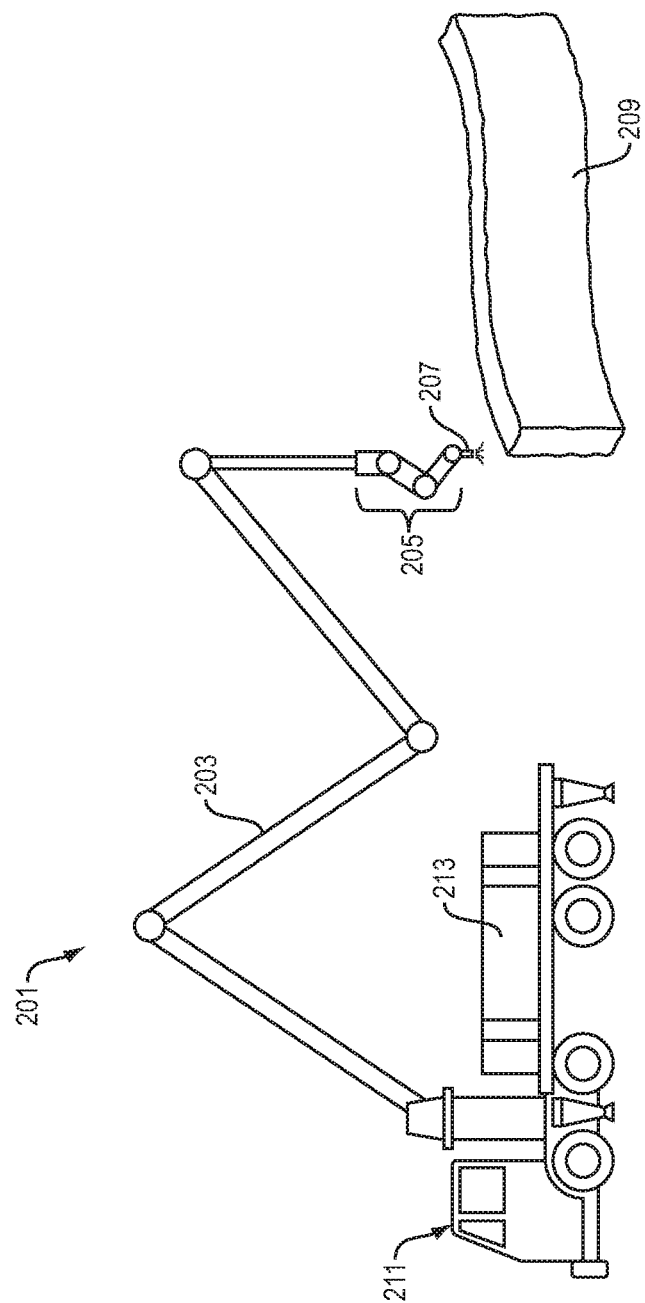
FIG. 2 shows a fabricator arm which includes a compound boom arm, a smaller robotic arm, and a tool module.

FIG. 2 shows a fabricator arm 201 which includes a compound boom arm 203, a smaller robotic arm 205, and a tool module 207. The tool module 207 may include apparatus configured for performing one or more tasks, including spraying, milling or painting. In the example shown in FIG. 2: (i) a spray nozzle in the tool module 207 is spraying foam to produce a double-curved wall 209; and (ii) the wall 209 is part of a mold, the rest of which has not yet been 3D printed. The fabricator arm is attached to, and configured to be transported by, a vehicle 211. The vehicle 211 may be configured for carrying a human driver or may be a mobile robot that operates without a human onboard. The vehicle 211 contains tanks or other containers (e.g., 213) for storing foam (or ingredients used in producing or expelling foam from a nozzle).

FIG. 3 shows a spray nozzle 301 mounted on a fabricator arm 303. The nozzle 301 is fabricating walls 305, 307 of an insulative mold.

Figure 4:
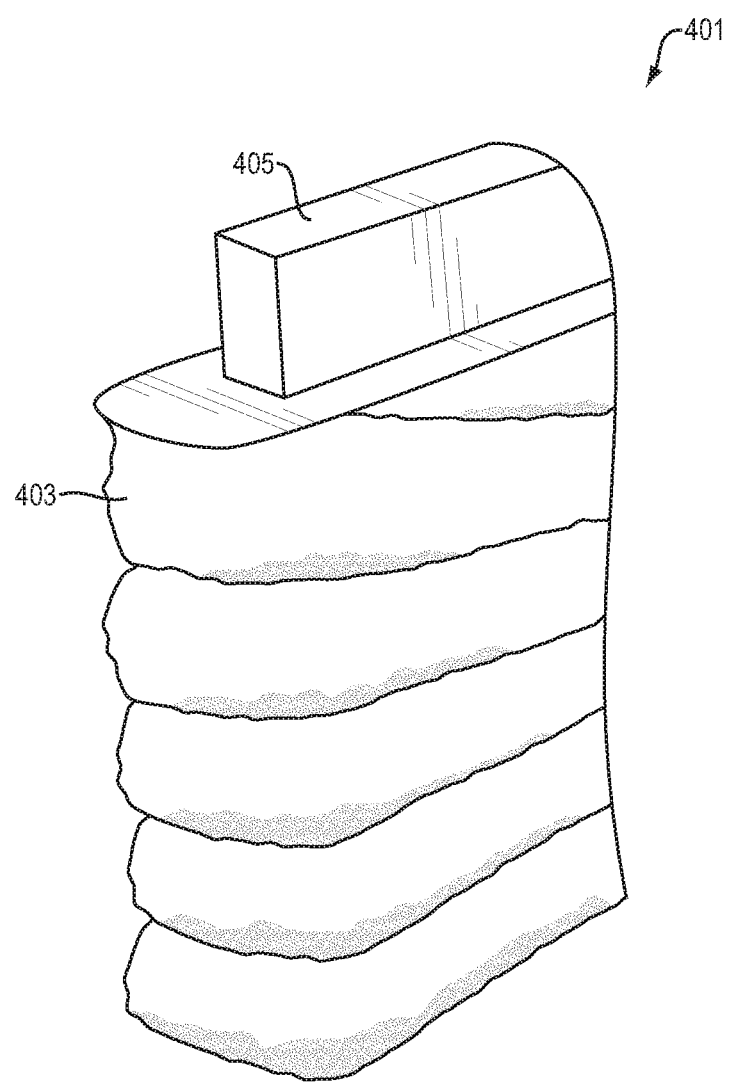
FIG. 4 shows part of an exterior surface of a wall of a foam mold. The surface includes a rough area (produced by spraying foam) and a smooth area (produced by milling sprayed foam after the foam hardened).

FIG. 4 shows part of an exterior surface of a wall of a foam mold 401.

The surface includes a rough area 403 and a smooth area 405. The rough area 403 was produced by spraying foam. The smooth area 405 was produced by milling sprayed foam after the foam hardened.

Figure 5:
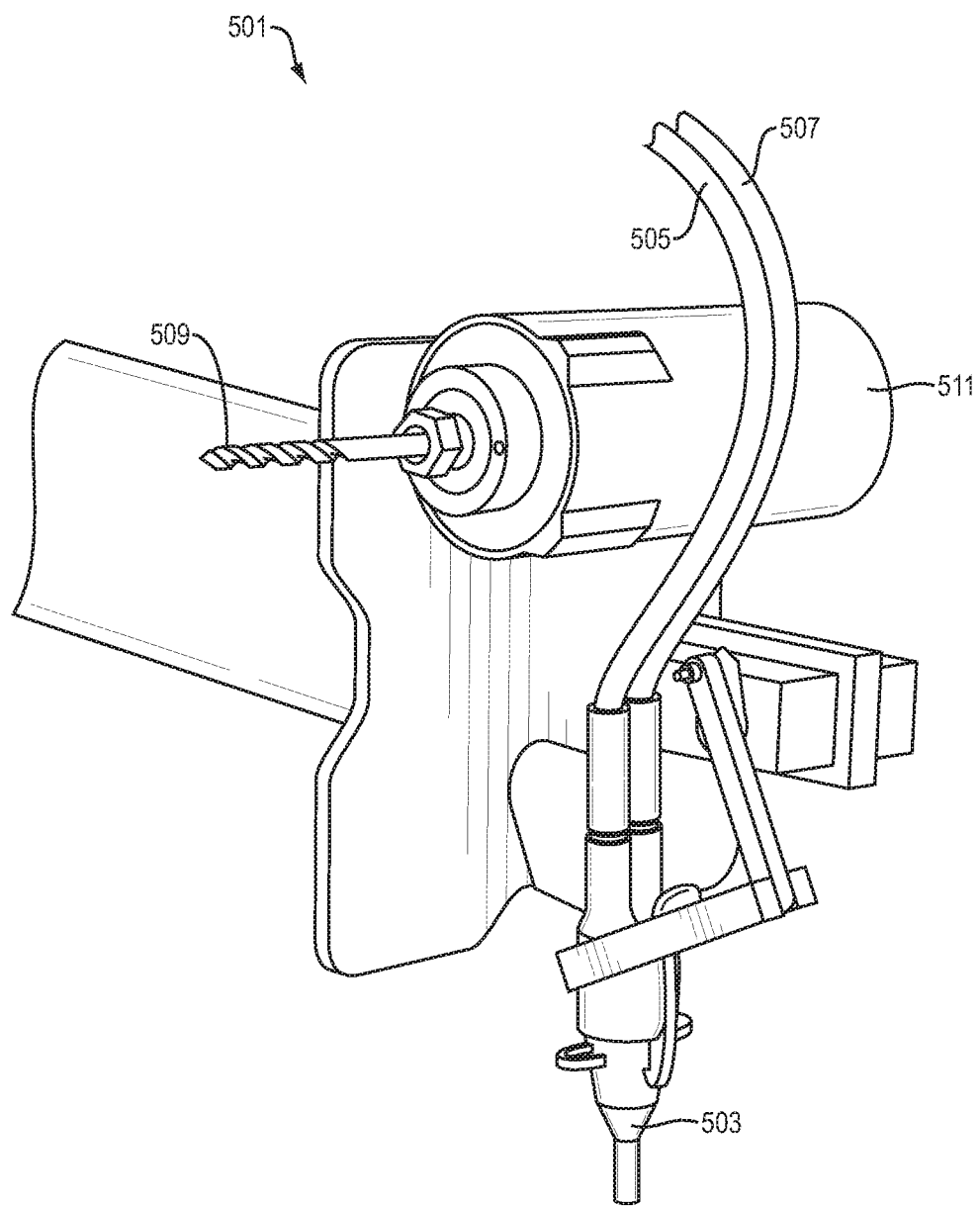
FIG. 5 shows a tool module at the end of a fabricator arm. The tool module includes apparatus for both additive and subtractive fabrication.

FIG. 5 shows a tool module 501 at the end of a fabricator arm. The tool module includes apparatus for both additive and subtractive fabrication. In the example shown in FIG. 5, the apparatus for additive fabrication is used for spraying foam, and comprises a disposable nozzle 503 and two hoses 505, 507. For example, the two hoses may be used for delivering (to the nozzle 503) either (i) two liquid components of a chemically curing foam, or (ii) a liquid and a high-pressure gas. In the example shown in FIG. 5, the apparatus for subtractive fabrication comprises a milling bit 509 and a motor 511 for powering the bit 509. However, the apparatus for subtractive fabrication is not limited to a milling device. Any other device configured for subtractive fabrication may be used instead or in addition to a milling device. The robotic arm can position and orient the tool module in a wide range of positions and orientations. For example, the robotic arm may have six degrees of freedom and may be mounted on a mobile platform (e.g., a vehicle).

In the example shown in FIG. 5, the spray nozzle sprays foam. Once the foam hardens, the foam has a rough, uneven surface. The drilling bit can be used to create a smooth surface, by removing foam from the rough, uneven surface.

Figure 6A:
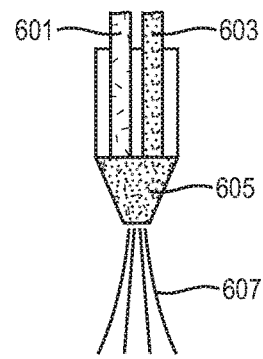
FIGS. 6A, 6B, 6C show three examples of spray apparatus for spraying foam.
Figure 6B:
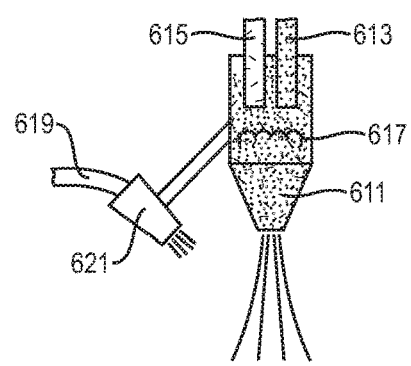
Figure 6C:
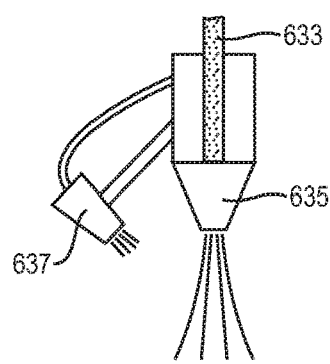

FIGS. 6A, 6B, 6C show three examples of spray apparatus for spraying foam.

In FIG. 6A, the foam chemically cures. Two chemical components are delivered by two hoses 601, 603, respectively, and mixed in and sprayed from a disposable mixing nozzle 605. The width of the spray 607 can be controlled by changing the distance between the nozzle tip and the object being 3D printed.

In FIG. 6B, the foam thermally sets. High-pressure gas is fed into a mixing chamber 611 via a hose 613. In addition, plastic is fed through a second hose 615 or other inlet into the mixing chamber 611. A heating element 617 melts the plastic feed. Optionally, another hose 621 and a nozzle 623 are used to blow air or another gas over the foam after the foam is sprayed, in order to speed thermal curing.

In FIG. 6C, the foam optically cures. A pressurized optically-sensitive resin is fed through a hose 633 and sprayed from a nozzle 635. Alternately, hose 633 delivers pressurized resin and an additional hose delivers pressurized gas to mix with the resin, before it is sprayed out of the nozzle 635. A light source 637 emits light to cure the resin after it has sprayed. For example, the light source 637 may comprise an LED, halogen light bulb, UV light source, plasma arc light bulb, or a laser. Alternately, light from the sun could cure the resin.

In addition to the examples shown in FIGS. 6A, 6B, 6C, a wide variety of foam sprayers may be employed, with different configurations of tubes, inlets, nozzles or mixing chambers. For example, the nozzle: (i) may have one or more outlets; (ii) may have notches (e.g., a V notch); (iii) may have an impingement surface (e.g., flat or spiral), and (iv) may have a swirl chamber (to produce a hollow cone spray pattern).

In exemplary implementations of this invention, the spraying of foam can be precisely controlled. For example, spraying may be paused by closing valves in or adjacent to inlet hoses. Extra material not used in one printing project can be saved for the next structure to be 3D printed.

To spray foam, either the foam components can be pressurized, or an external pressure line (e.g., air or nitrogen pressure) can be incorporated into the mixing chamber, providing the energy to spray the foam. By controlling the pressure (through a valve), the speed of the spray can be controlled, which can affect pore size, foam density, and other foam properties.

As used herein, "extrusion" means a process used to create objects of a fixed, cross-sectional profile. In "extrusion", a material is pushed or drawn through a die of the desired cross-section. Grammatical variations on "extrusion", such as "extrude" shall be construed in like manner.

In some implementations of this invention, spraying has many advantages, as compared to casting or extrusion. Here are five examples: First, sprayed foam can conform to the target surface. For example, even if the target surface is rough, sharply angled or otherwise varies in geometry depending on position, sprayed foam can conform to the surface with strong layer adhesion. Second, the size or profile of layers in layer deposition can be easily changed when spraying foam (e.g., by changing the position of the nozzle relative to the layers being deposited, or by changing a disposable mixing nozzle to create a different spray pattern). Third, disposable, interchangeable nozzles may be easily employed. This prevents the deposition mechanism from jamming. (In addition, any tendency for the deposition material to harden within the spraying device is mitigated because, while spraying, the cure process—e.g., chemical, thermal or optical—does not occur after the foam is ejected from the nozzle). Fourth, spraying allows for multi-angle deposition, such as against gravity, so material can be sprayed vertically upwards, or at an upward angle, or purely horizontally, and still adhere to a target surface. Fifth, spraying an expanding material can be easier to control than extruding it. For example, when depositing an expanding material (e.g., polyurethane foam), it can be easier to maintain a uniform flow rate (across a cross-section of the outlet of the deposition mechanism) when spraying than when extruding. Extruding an expanding material is difficult due to a changing volumetric density of the extruded bead, which can vary flow rates and clog a nozzle if plug flow is not accomplished. In contrast, during spraying, the higher velocities and distance between nozzle and target surface aid flow control.

In illustrative implementations of this invention, the spray technique offers an easy method for changing the profile of the layer. Through different nozzles (interchangeable, disposable nozzles), different spray patterns can be achieved. For spray patterns with a changing profile over height, like a fan-shape spray pattern, the height of the nozzle from the target surface controls the width and thickness of the printed layer. By rotating the nozzle (assuming a flat fan pattern spray), the profile width and thickness can also be varied. Changing the nozzle translation speed (robotic arm speed) allows for thicker layers to be printed. A spray nozzle can continue to spray on top of previously sprayed layers of material without altering position.

Spraying may be used to create closed voids or interior features in either the foam mold or the cast structural material. For example, in order to create a closed void or interior feature in the foam mold, multi-angular deposition can be used to create overhang structures for the "roof" of the void or interior feature, layer by layer. Or, for example, in order to create a closed void or interior feature in the cast structural material, foam can be 3D printed and then a portion of the foam subtractively removed (e.g., by milling or dissolution) to reveal internal features and voids. In the case of a closed void, any remaining entrance to what will become the closed void (which remains after the multi-angular deposition or subtractive removal) may then closed (e.g., by spraying more foam). As used herein, a "closed void" means a cavity which is surrounded in its entirety by a solid physical surface that is closed and orientable.

The robotic arm can position the spray nozzle to spray foam in any direction, including at any altitudinal angle (e.g., vertically up, vertically down, at an angle that includes a vertically up or vertically down component, or purely horizontal) and at any azimuthal angle. The robotic arm can also position the spray nozzle to spray at different distances from the object being 3D printed.

In some applications of this invention, the foam sprayer sprays foam into a free space during a multi-cure period. To deposit (including to spray) material "into a free space" during a multi-cure period means to deposit the material into a region such that, at all relevant times for the multi-cure period, the material deposited is constrained, if at all, by constraining solid surface(s): (i) that consist of no more than one side of a rectangular cuboid (if the constraining surface(s) consist of only a side or sides of a rectangular cuboid), or (ii) that subtend no more than 2.1 pi steradians of a sphere centered at the centroid of the deposited material, when observed from that centroid (if the constraining surface(s) do not consist of only a side or sides of a rectangular cuboid). For purposes of the immediately preceding sentence: (a) the constraining surface(s) do not include the deposited material itself; (b) "all relevant times for the multi-cure period" means: (i) at all times immediately after any part of the material is deposited in the region during the multi-cure period, and (ii) if the material undergoes expansion before curing, at all times immediately after any part of the material deposited during the multi-cure period finishes this expansion; and (c) a "multi-cure period" is a time interval equal to five times the cure time for the deposited material.

The foam may be sprayed to produce objects (e.g., mold walls) that are curved, doubly curved, overhanging or cantilevered or that span unsupported horizontal distances. The spraying may be part of a 3D printing process.

Figure 7:
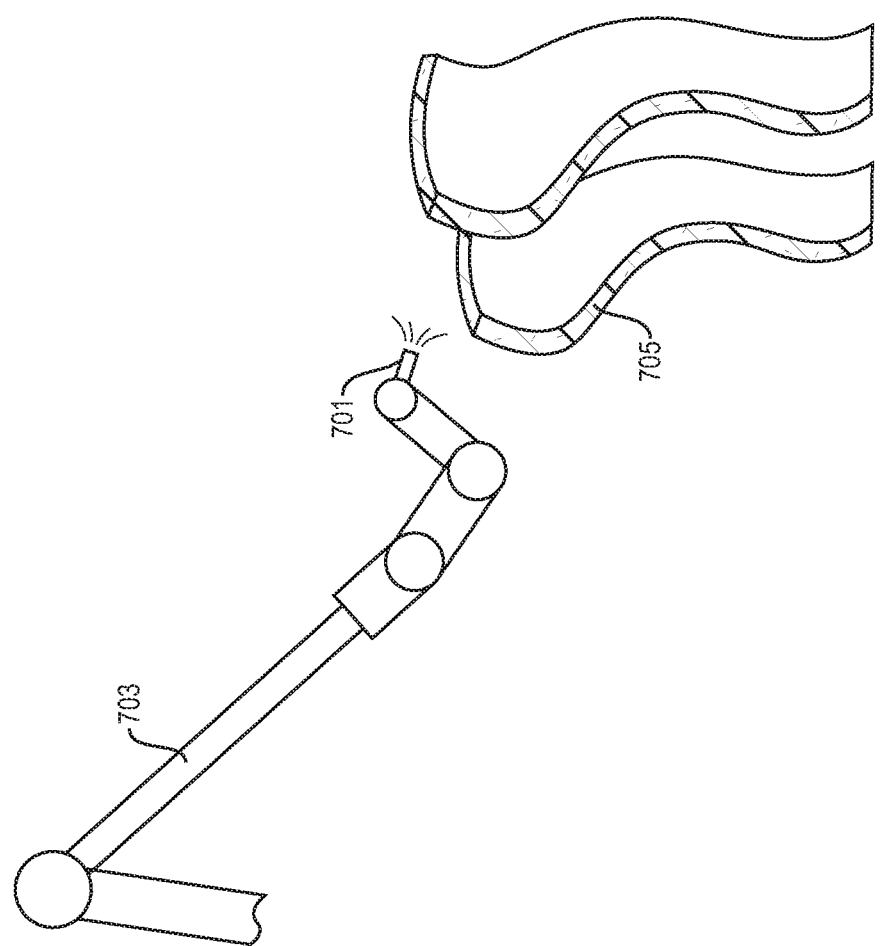
FIG. 7 shows a spray nozzle fabricating a doubly curved mold with overhang.

FIG. 7 shows a spray nozzle 701 on a robotic arm 703 spraying foam to fabricate a doubly curved wall 705 of a mold. The doubly curved wall 705 has an overhang. The curved wall 705 is shown in a cross-sectional view. Using a spray nozzle, fast curing foam can be sprayed using a multi-axes robotic arm to achieve overhangs. As the foam is sticky, low-density, and fast-curing, overhang structures can be printed without support material directly underneath the overhang.

Figure 8:
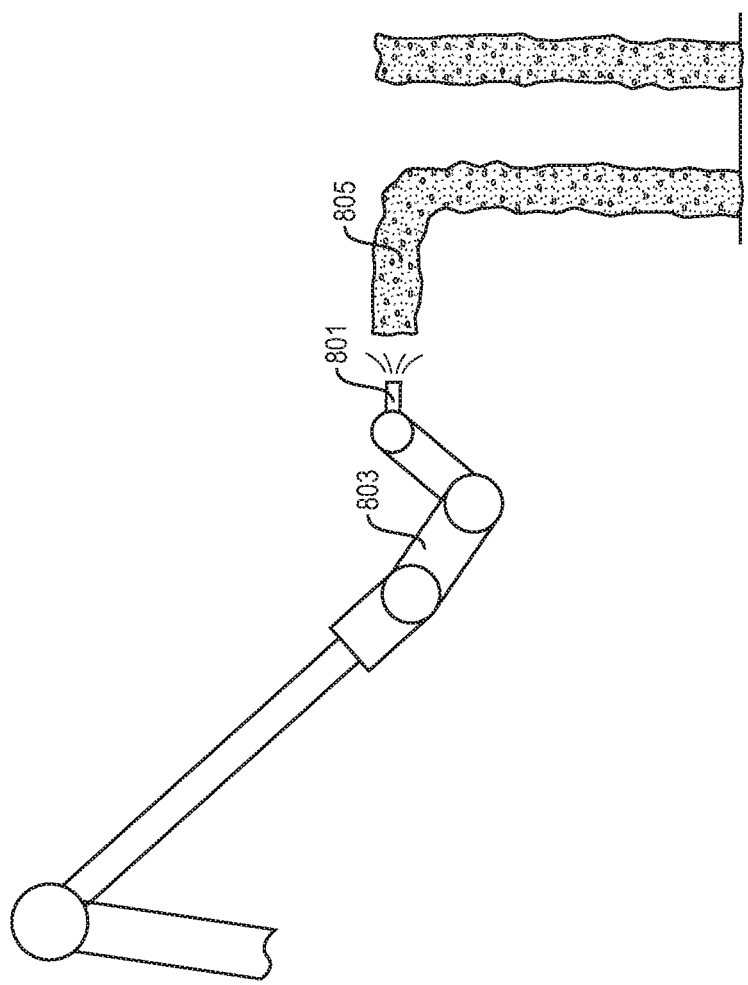
FIG. 8 shows a robotic arm spraying foam to produce a purely horizontal part of a mold.

FIG. 8 shows a spray nozzle 801 on a robotic arm 803 spraying foam to produce a purely horizontal part 805 of a wall of a mold. The purely horizontal part is being 3D printed, without support material directly underneath the purely horizontal part.

Multi-floor structures can be constructed in a similar way. To 3D print a foam mold for a flat floor of a multi-floor building may, in some cases, require additional support (e.g., the addition of temporary vertical foam supports, or printing foam onto a rebar and tie grid that is prepositioned in a region that will be included in the floor).

Objects may be embedded in the foam walls of a mold or in fill material cast in the mold, or both. For example, a robot or other actuated apparatus may automatically position an object, and then foam may be sprayed on top of the object in order to embed the object in the foam. Or, for example, the robot or other actuated apparatus may automatically insert the object into foam before the foam hardens, in order to embed the object into foam. If the embedded objects also protrude into the internal cavity of the mold, then the object will also be embedded in the fill material (e.g., concrete or plastic) when the fill material is cast in the mold. Or, for example, rebar which is not itself embedded in the foam mold walls may be held in place by ties that are embedded in the foam walls. This rebar may be embedded in the fill material when the fill material is cast in the mold.

For example, rebar (e.g., steel reinforcing bar), plumbing pipe, electrical conduit, windows, and other building objects can be embedded in (i) the foam mold walls, (ii) the fill material (e.g. concrete or plastic), or (iii) both.

In a prototype of this invention, a tie depositor deposits plastic tie elements that are automatically partially embedded in the foam. The tie holds the wall together and holds rebar in place during casting.

Figure 9A:
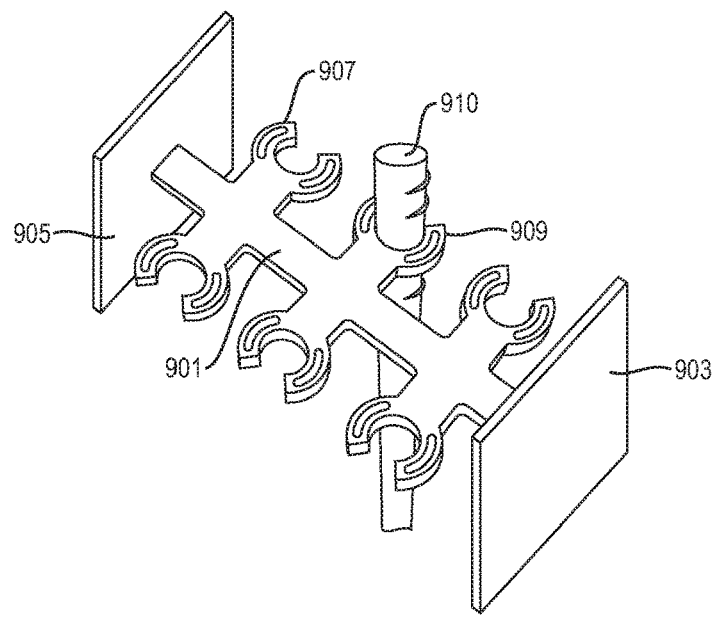
FIG. 9A shows a structural tie, with clips for holding rebar.

FIG. 9A shows a structural tie 901. The tie 901 includes two plates 903, 905, one at each end of the tie. The metal plates can be embedded in wet foam, or placed adjacent to hardened foam and more foam may be sprayed on top on them. The tie also includes clips (e.g., 907, 909) for holding rebar (e.g., 910).

Figure 9B:
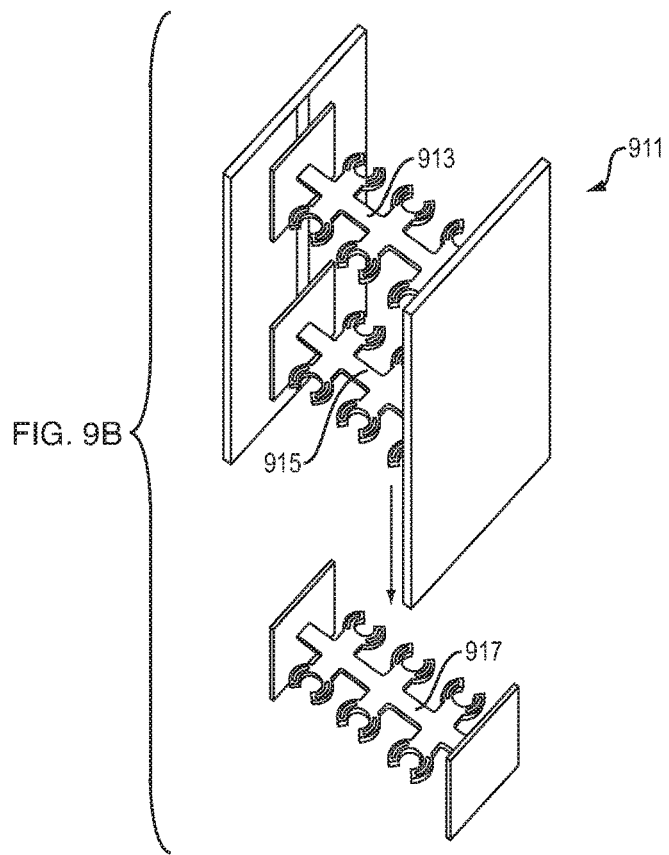
FIG. 9B shows a mechanism for automatically embedding ties into wet foam walls of a mold.

FIG. 9B shows a tie depositor 911 for automatically positioning structural ties (e.g., 913, 915, 917). The positioning may comprise embedding a portion of the ties into wet foam walls of a mold. Alternately, the positioning may comprise placing the ties beside or on top of a hardened mold part and then spraying more foam to embed the ties. These tie supports deposited by the tie depositor may be embedded (e.g., at regular intervals) for multiple purposes:

for example, for holding rebar in place for structural support of the cast wall, for structural support of the mold (including helping the mold maintain its shape during the casting process), and for fixturing (e.g., for finishing techniques, and for mounting objects to the finished surface).

The insertion of these ties can be automated into the 3D printing process and a mechanism for depositing the ties can be attached to the 3D printing apparatus.

Figure 10:
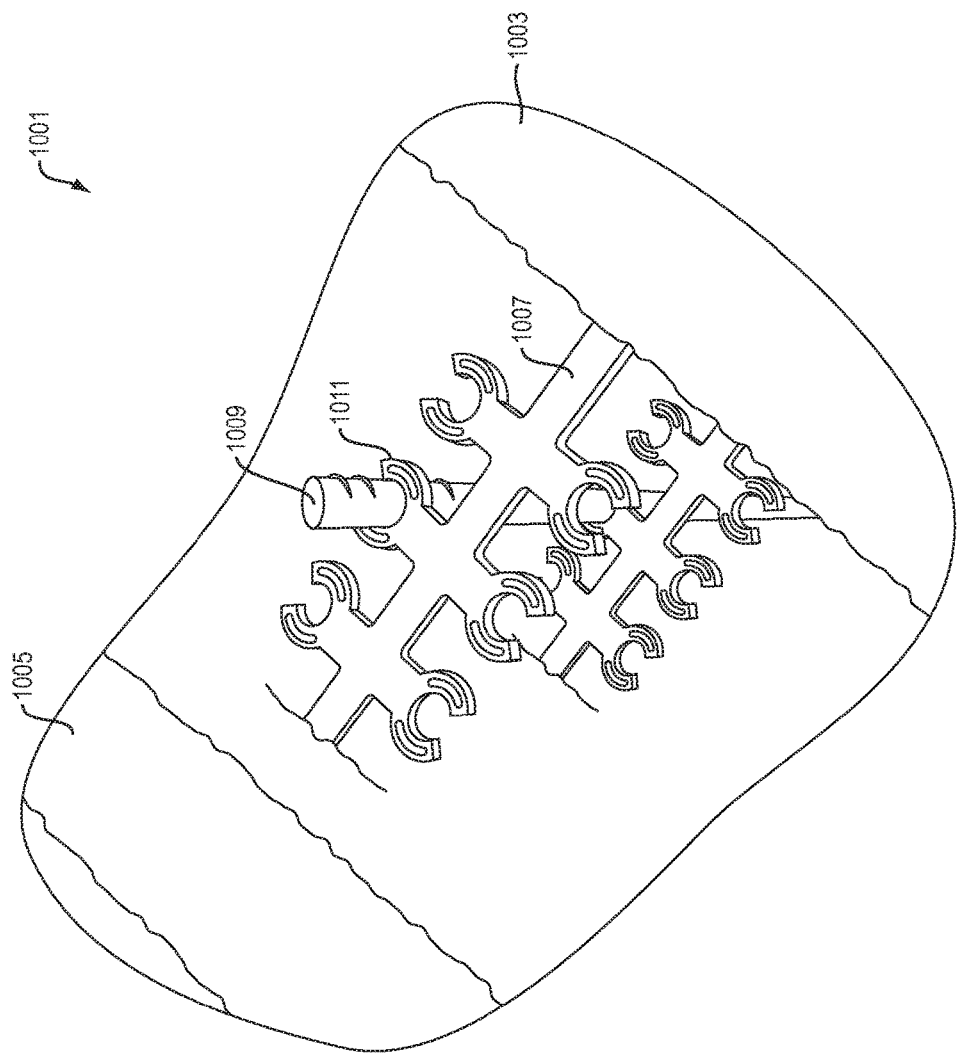
FIG. 10 shows a foam mold with curved walls, embedded ties and rebar.

FIG. 10 shows a foam mold 1001. The foam mold has curved walls 1003, 1005. The ends of ties are embedded into the walls. The ties (e.g. 1007) hold rebar (e.g., 1009). Each rebar (e.g. 1009) snaps into a clip (e.g., 1011) on a tie.

Figure 11:
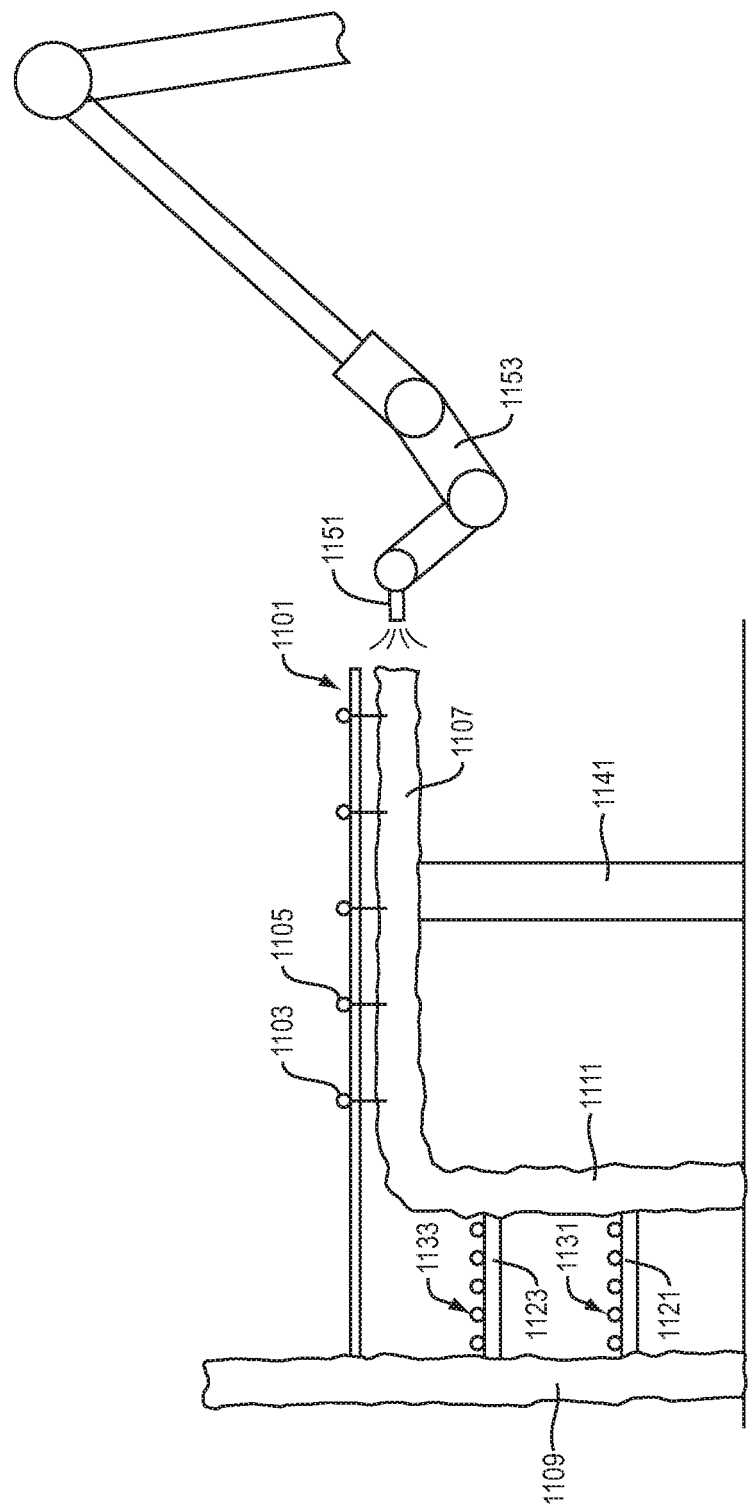
FIG. 11 shows a mold for, among other things, a horizontal floor.

FIG. 11 shows a cross-sectional view of a mold for casting, among other things, a horizontal floor. A grid of rebar 1101 is held in position by ties (e.g., 1103, 1105) that are partially embedded in a horizontal part 1107 of a mold wall. Other portions (e.g., 1109, 1111) of the walls of the mold are vertical. Additional ties (e.g., 1121, 1123) and rebar (e.g., 1131, 1133) are embedded in or positioned in the cavity of the vertical walls of the mold. A temporary vertical support 1141 may be needed when spraying the foam or casting the filler material. In the example shown in FIG. 11, a spray nozzle 1151 on a robotic arm 1153 is used to spray the foam.

This invention is not limited to casting concrete or plastic in the foam mold. Any type of castable structural material may be cast in the mold. For example, the castable material may comprise concrete, cement, plastic, plastic-wood composites, structural foams, or metal. If metal is cast, then it is preferable to use a high temperature foam or coat the foam with a high temperature material and allow the metal to burn away and replace the foam. For example, a 3D printed foam mold finished with milling could be used to cast a bronze statute.

In some implementations of this invention, a robotic delivery system deposits cast material with spatially-varying properties (in contrast to a conventional homogeneous pour which is also possible with this invention). For example, by having multiple nozzles and taking advantage of the diffusivity of the cast material, a material gradient in the cast material can be achieved spatially. For example, different densities of concrete could be extruded to achieve a sandwich panel effect (where the outside surface has the highest density and the core has a lower density). Many different material gradients are possible, such as density, color, elasticity, aggregate, composite ratio, etc. The use for this in buildings allows for weight/material savings, new dynamic tune ability for dampening vibrations (i.e. earthquakes), aesthetic possibilities, etc.

Alternately, the sprayed foam may have spatially-varying properties. The variation may comprise a continuous gradient.

For example, to create a spatial gradient in sprayed foam, multiple spray nozzles for the foam may be used. Or, for example, in the case of a multi-component foam, the rate of input of various ingredients of the foam may be varied in order to vary the composition of the foam being sprayed, and thus may produce spatially-varying properties in the sprayed material after it cures.

FIG. 12 shows a foam wall 1201 with an opacity gradient. Different portions of the foam wall 1201 are opaque 1203, 10% translucent 1205, 30% translucent 1207, 70% translucent 1209, and 100% transparent 1211. The opacity gradient was produced by spraying foam with different opacities at different positions in the foam wall.

As noted earlier, a spray nozzle may spray foam, layer by layer, to 3D print an internal form.

After a foam sprayer prints an internal form with foam, the internal form may then (in accordance with a CAD model or other digital information) be wrapped on site in fiber, or sprayed on site with fiber. For example, the fiber may comprise fiberglass, and the fiberglass structure that is constructed on site using the internal form may be a wind turbine blade that it is too large to be transported by truck to the site.

The fabricated object that is produced by spraying or wrapping fiber onto the internal form may have one or more of the following features: doubly curved surfaces, or internal features (e.g., voids and internal components, both embedded and loose). The object can be fabricated on site. In some cases, the internal form can remain inside the fiber-reinforced skin, creating a composite structure (e.g., a sandwich panel).

More generally, the fiber may be deposited in any way to or around the internal form.

3D printing an internal form by spraying foam can avoid size constraints on the fabricated object that would otherwise be imposed by transportation (e.g., maximum size that can be transported by a vehicle or on a road), or by conventional factory manufacturing apparatus.

Other fiber-skinned or fiber-composite objects may be fabricated in this way, including boat hulls, fuselages for airplanes, spacecraft components, and other large fiber composite structures.

Figure 13A:
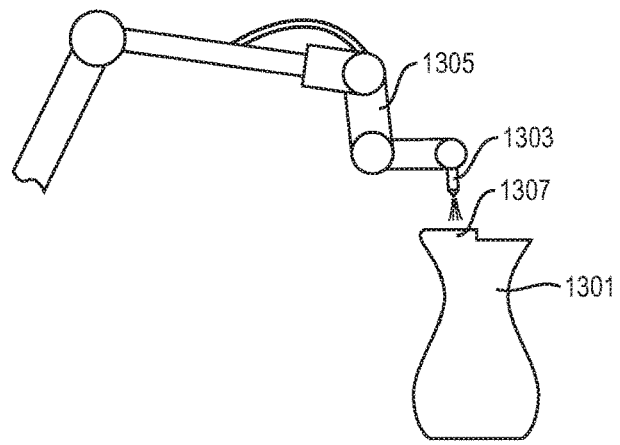
FIGS. 13A, 13B and 13C show an internal form that comprises foam.
Figure 13B:
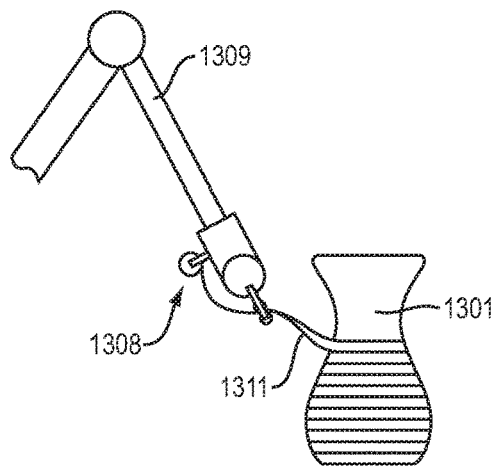
Figure 13C:
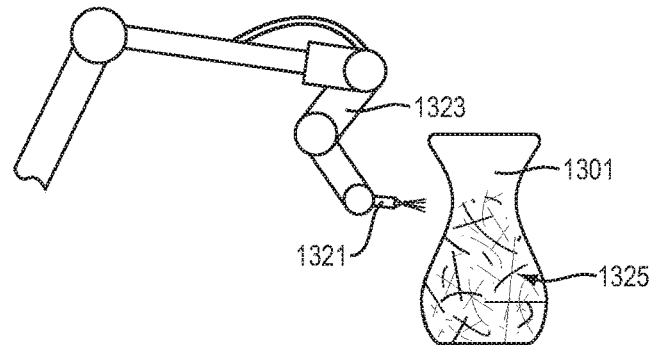

FIGS. 13A, 13B and 13C show an example of an internal form that comprises foam. In FIG. 13A, a spray nozzle 1303 on a robotic arm 1305 is spraying foam to create a doubly curved internal form 1301. In the example shown in FIG. 13A, the top layer 1307 of the internal form 1301 has only been partially printed. In FIG. 13B, an applicator 1308 on a robotic arm 1309 is wrapping tape 1311 around the exterior of the internal form 1301. The tape includes fiberglass. In FIG. 13C a spray nozzle 1321 on a robotic arm 1323 is spraying chopped fibers 1325 on the exterior of the internal form 1301.

In illustrative implementations of this invention, a fabricator arm is used for 3D printing. The fabricator arm comprises (from one end to another), a large boom lift, a smaller robotic arm, and a tool module. The tool module may include, for example, a spray nozzle for spraying fast-curing foam, a milling apparatus, or painting apparatus for spraying paint. The fabricator arm is actuated (e.g., by a motor or engine) and may be mounted on a mobile platform (e.g., a truck).

The fabricator arm offers benefits of cost, accuracy, and reach. The fabricator can perform on-site 3D printing, milling, painting, and other construction techniques with digital control. Because the fabricator arm combines a low-accuracy large-reach boom arm with a high-accuracy, high-speed small robot arm, the fabricator arm can perform large-scale accurate positioning for computer-assisted construction. The motion of the end of the boom arm can be tracked. Data from this motion tracking can be used by processors in order to control the small robot arm to compensate for vibrations and wind loading, and to increase the resolution of positioning. In some implementations, the fabricator arm can move the tool module with at least 6 degrees of freedom.

In a prototype of this invention, a laser tracking system tracks a point on the fabricator arm in all 6 degrees of freedom with low latency and high precision in an outdoor environment. The module uses mirror galvanometers to scan a laser in a defined pattern until a photosensor mounted on the boom arm head produces a signal due to the laser beam hitting a photosensor. This coordinate is recorded and the scan pattern is re-defined and centered on the new known coordinates of the photosensor. This is repeated for however many photosensors are desired (each photosensor provides 2 degrees of freedom, plus a $3^{rd}$ degree of depth if the brightness is utilized as information). The photosensors can be mounted on the object being tracked (e.g., a point on the fabricator arm).

Alternately, retroreflectors can be positioned on the object being tracked and the photosensors can be mounted alongside the laser and mirror galvanometer setup. Alternately or in addition, other motion tracking sensors (e.g., rotary encoders, potentiometers, gyroscopes, accelerometers, or inertial measurement units) may be employed for tracking position.

Figure 14:
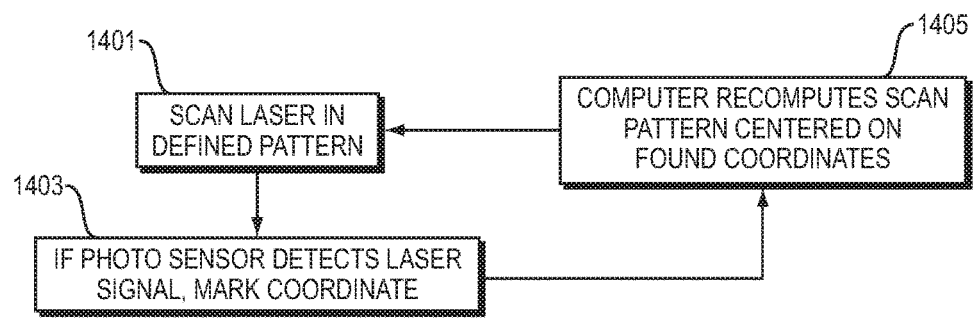
FIG. 14 shows a flowchart for laser motion tracking.

FIG. 14 shows a flowchart for laser motion tracking for positional control. Specifically, FIG. 14 shows a control loop for motion tracking, using a single photosensor. A computer outputs control signals to control mirror galvanometers to scan a laser 1401. If the photosensor detects a laser signal 1403, the computer calculates a new scan pattern centered on the found coordinates 1405. The process is repeated for additional photosensors.

Figure 15A:
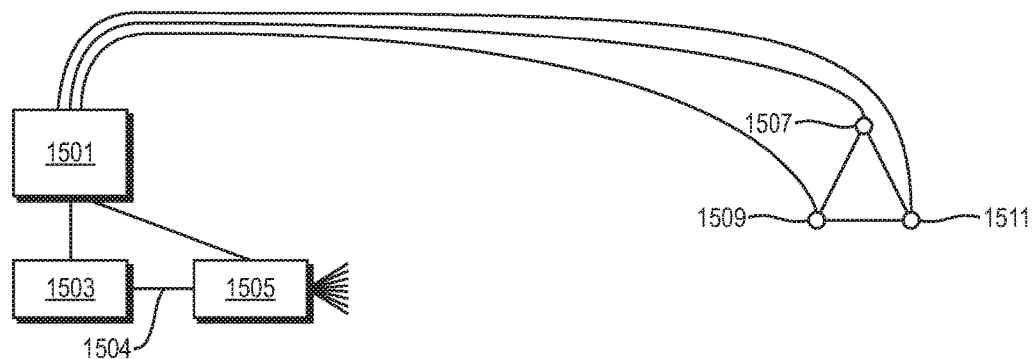
FIGS. 15A and 15B show a system for this laser motion tracking.

FIG. 15A is a high-level block diagram of some hardware that may be included in this laser tracking system. One or more processors 1501 output control signals for controlling (i) a laser 1503 and (ii) mirror galvanometers 1505 that scan light 1504 from the laser. The one or more processors 1501 also receive and process sensor data from three photosensors (1507, 1509, 1511) positioned on the object being tracked. In the example shown in FIG. 15A, the photosensors are positioned in a triangular array on the object being tracked, which provides all 6 DOFs for tracking. Alternately, retroreflectors may be placed on the object being tracked. In that case, photosensors may be deployed adjacent to the laser and mirror galvanometers, and may detect laser light bouncing back from the retroreflectors.

Figure 15B:
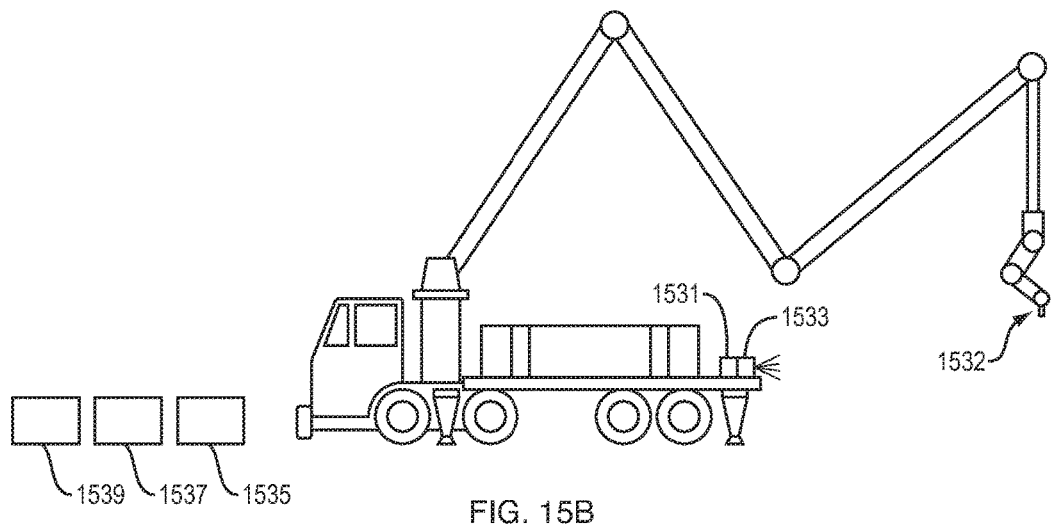

FIG. 15B is a perspective view of an example of this later motion tracking system. In this example: One or more processors 1531 and a module housing the laser and mirror galvanometers 1533 are mounted on a mobile platform (e.g., a vehicle). The photosensors or retroreflectors are positioned adjacent to an end of a fabricator arm 1532.

A variety of different positioning systems may be used to position the spray nozzle. For example, the system may utilize any nozzle positioning system, such as a gantry system, wire-cable system, robotic arm, or a swarm of small mobile robots.

In the latter positioning system (the swarm), the small mobile robots can print structures much larger than themselves. Mobile robots spray the foam mold material as they travel, leaving behind trails of printed foam. Because the foam cures quickly and can support a significant load, these robotic systems can travel up previous printed layers in order to 3D print large structures.

For example, a small mobile printer can carry the foam ingredients mixture onboard or have flexible tubes connected to an exterior chemical tank. In an exemplary implementation of this invention, the mobile robot has two spray nozzles that are aligned with the wheel distance. The two spray nozzles are positioned behind the robot's rear wheels. This allows the robot to drive up the previously printed structure using the foam mold as tracks for its wheel base. In this setup, the mobile printer can follow the perimeter of a desired building and spiral upwards on its previously printed tracks. Different mobile robotic forms can also be used, including ground-based and air-based mobile systems. Precise positioning tracking can be accomplished through a number of systems ranging from GPS, to wheel encoders, to optical tracking from a stationary position. Multiple mobile printers can also be used to expedite the printing process or serve different roles. For instance, some of the units could do the foam printing, while others provide supplementary roles such as rebar insertion, pluming configuration, or wall painting.

In some implementations, the small mobile robot can carry a load of foam (or foam ingredients) sufficient to 3D print a large volume. In order to accomplish this, the foam may be low-density and may expand after being deposited.

Figure 16:
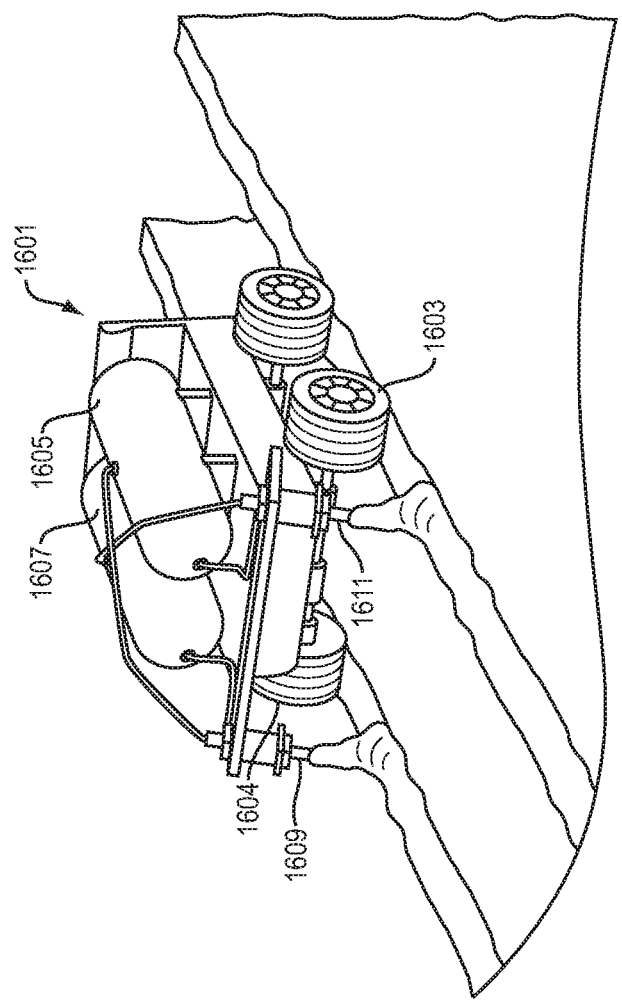
FIG. 16 shows a small mobile robot configured for spraying foam.

FIG. 16 shows a small mobile robot 1601 configured for spraying foam. The mobile robot 1601 rolls on wheels (e.g., 1603, 1604). Foam ingredients are stored onboard the mobile robot, e.g., in two tanks 1605, 1607. Two spray nozzles 1609, 1611 are positioned adjacent to the rear wheels 1603, 1604.

Figure 17:
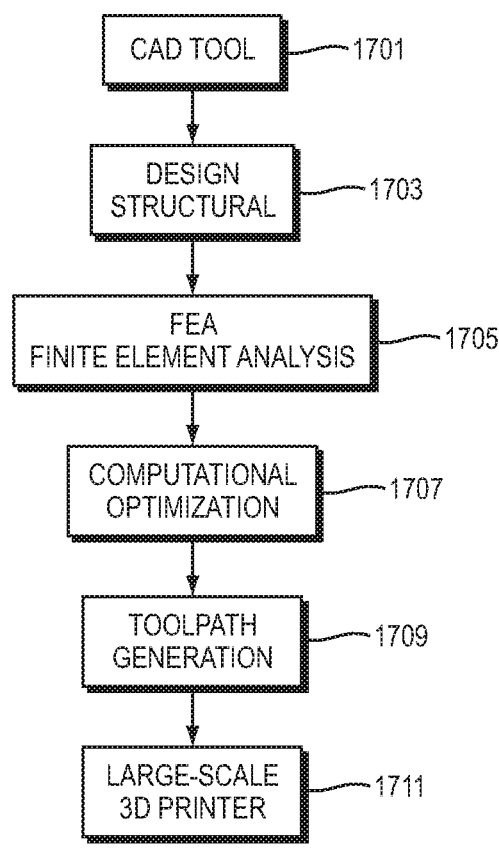
FIG. 17 shows a block diagram for a tool chain for, among other things, designing and analyzing a large-scale structure.

FIG. 17 shows a block diagram for a tool chain for, among other things, designing and analyzing a large-scale structure. One or more processors employ a CAD tool 1701. In addition, the one or more processors perform structural design 1703, finite element analysis 1705 (including analysis of structural performance and thermal performance), computational optimization 1707, and toolpath generation 1709. Also, the one or more processors output signals for controlling a large-scale 3D printer 1711.

The tool chain of going from a design, to an optimized design, to a produced building can thus be automated. To a large extent, the actual physical construction process can be machine controlled. Thus, machine tolerances and physical errors can be quantified and put into the computational model. (This is in contrast to a conventional approach, where designs are in CAD and can be optimized, but then much is lost in translation between the architect, engineer, contractor, and construction worker. The human error is difficult to quantify.) With this tool chain, structural, thermal, financial, and time optimizations can be done with process parameters known, and can be output and produced all in the same tool chain. The tool chain can be sent to a large-scale 3D printer.

One or more processors (e.g., 1531, 1535, 1537, 1539) may (i) process data, including data from sensors for close loop control, including sensor data from one or more motion tracking sensors (e.g., photosensors, rotary encoders, potentiometers, accelerometers, gyroscopes, and IMUs), (ii) perform calculations, including calculations regarding additive fabrication (e.g., spraying foam), subtractive fabrication (e.g., milling to create a smooth surface) or painting, in accordance with one or more CAD models, and (iii) perform other calculations, including calculations regarding motion tracking, positional control, navigation (e.g., of a swarm of mobile robots), cure times, foam ingredient storage levels, valve positions, CAD modeling, structural design, finite element analysis, toolpath generation, and "slicing" STL files. Furthermore, the one or more processors (e.g., 1531, 1535, 1537, 1539) may output control signals to control aspects of the construction system, including (A) motors or engines to actuate movement, including movement of robot arms, spray nozzles, lift booms, vehicles, valves, grasping mechanisms, tie depositor mechanisms, and steering mechanisms, and (B) temperature, voltage or current levels for heating elements, in the case of thermally curing foam. The control signals may include STL files, slices of STL files, or other digital designs or toolpaths. At least some of the one or more processors may comprise computers, including host servers or client computers. The processors may be linked to one or more other electronic hardware components in the system, including by a wired or wireless connection. The one or more computer processors may be arranged in any physical or network configuration, including at a distance from each other. For example, at least some of the one or more processors may be remote from the apparatus that sprays foam.

In some aspects, this invention comprises articles of manufacture. FIGS. 18-21 show some non-limiting examples of these articles of manufacture.

Figure 18:
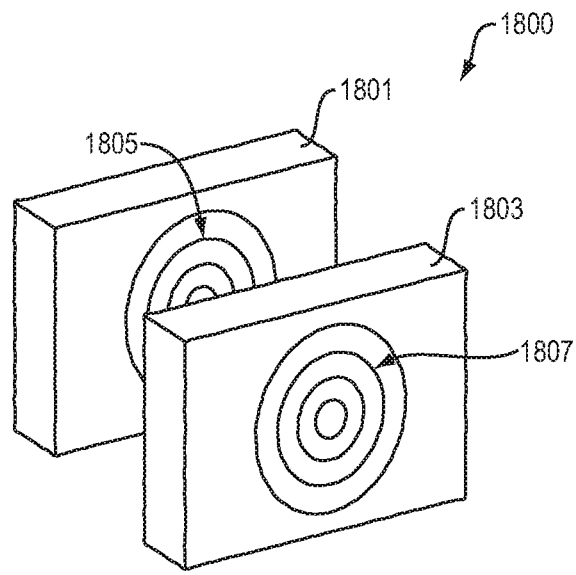
FIG. 18 shows a foam mold that comprises two walls, each of which respectively has an opacity gradient.

FIG. 18 shows a foam mold 1800 that comprises two walls 1801, 1803. The two walls have opacity gradients 1805, 1807. A transparent or translucent material may be cast inside these mold walls.

Figure 19:
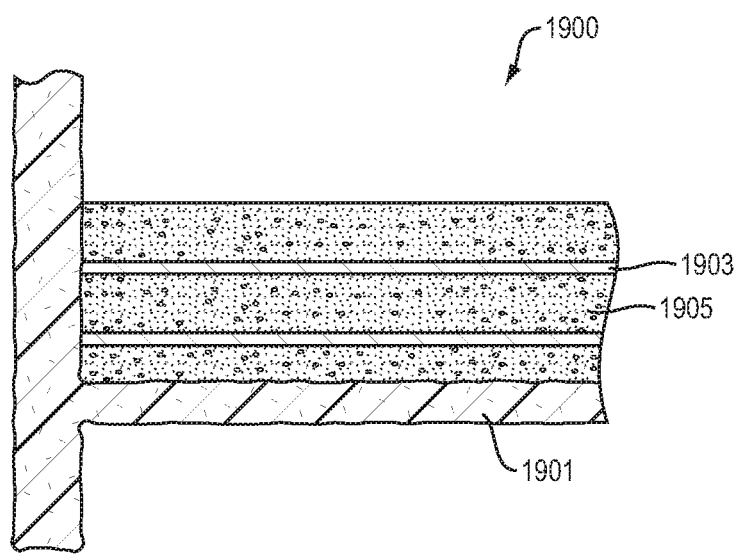
FIG. 19 shows a cross-sectional view of a horizontal floor which spans over an unsupported region. The horizontal floor includes a foam mold, rebar grid, and cast structural material.

FIG. 19 shows a cross-sectional view of a horizontal floor that includes a span that is not directly supported underneath. The horizontal floor 1900 includes a foam mold 1901, rebar grids (e.g., 1903), and cast structural material 1905. The ties are not visible in this cross-section.

Figure 20:
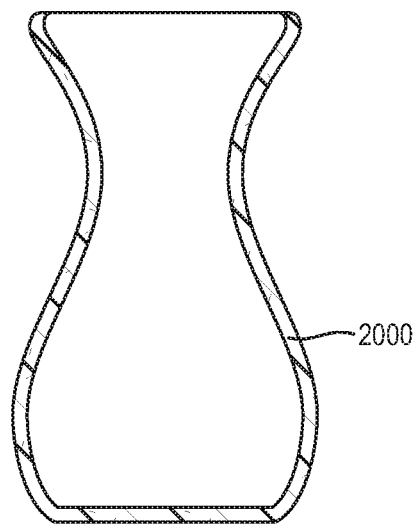
FIG. 20 shows a cross-sectional view of a doubly curved object. The walls of the object comprise foam. Fiber glass (or carbon fiber) and resin have been applied to the exterior surface of the object.

FIG. 20 shows a cross-sectional view of a doubly curved object. The walls (e.g., 2000) of the object comprise foam that has been sprayed and then cured. Fiberglass (or carbon fiber) and resin have been applied to the exterior surface of the object.

Figure 21:
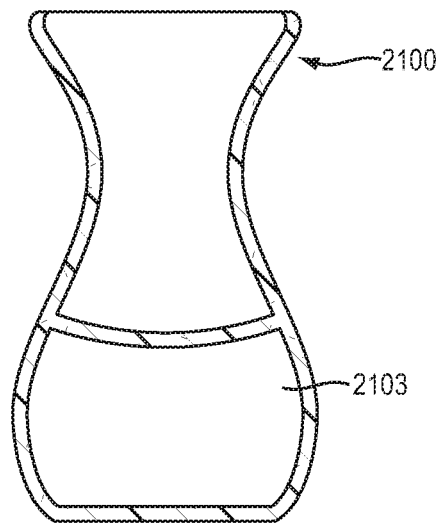
FIG. 21 a cross-sectional view of a doubly curved object with voids inside.

FIG. 21 a cross-sectional view of a doubly curved foam object 2100 with a closed void 2103 inside. The longest distance across of the closed void is more than 50 times longer than the pore size of the foam comprising the object.

In some implementations of this invention, sag-resistant foam is sprayed into free space during a multi-cure period to fabricate an unsupported span. The sag-resistant foam does not sag excessively (or fall apart) before curing.

In exemplary implementations, this invention has many advantages compared to conventional construction methods. For example: (1) buildings can be printed with cost-effective mobile printing units, requiring less human labor; (2) material wastage can be greatly reduced or eliminated (e.g., by spraying only the amount of bulk material needed for construction); (3) construction can be much faster (which can greatly reduce construction site time leading to substantial savings); and (4) custom aesthetics can be easily achieved, as the geometry is not constrained by rectilinear paths. By inputting different designs into a printer, every building can be unique.

Definitions and Clarifications

Here are a few definitions and clarifications. As used herein:

The terms "a" and "an", when modifying a noun, do not imply that only one of the noun exists.

An "applicator" means a device for applying a substance to a surface, or otherwise depositing, dispensing or moving the substance.

The term "bit" shall be construed broadly. The term "bit" includes (i) any milling cutter and (ii) any other tool configured to remove material from an object by shear deformation or abrasion while in physical contact with the material. A "bit" may, for example, operate by either linear or rotary motion.

The term "CAD model" shall be construed broadly. For example, the term "CAD model" includes any model that (i) was created or modified, at least in part, by a computer and (ii) is stored in electronic memory. A CAD model may be of any object. For purposes of this definition of CAD model: (i) the term "model" shall be construed broadly and shall include any model, design, mesh, representation, tool path or tool chain, and shall further include any set of data representing points in a 3D volume or positions in or elements of a 3D object, including the surface or interior of a 3D object, and (ii) the term "object" shall be construed broadly to include any shape, object or structure. A CAD model does not necessarily control the shape of an object produced by using the CAD model. For example, in some cases, a CAD model may function effectively as a non-binding recommendation or suggestion. Also, the phrase to fabricate "according to a CAD model" shall be construed broadly. For example, the phrase to fabricate "according to a CAD model" applies even if, due to machine tolerances or low resolution of fabrication, there is not a perfect correspondence between the CAD model and actual fabricated physical object.

A "closed void" means a cavity which is surrounded in its entirety by a solid physical surface that is closed.

The word "coat" means to (at least partially) coat, infiltrate, penetrate or encapsulate.

The term "control signal" shall be construed broadly. For example, a "control signal" includes any signal outputted by a first device for controlling a second device. As used herein: (a) "control signals" are not limited to enable, clock, read/write or similar signals; and (b) a signal may be a "control signal" even if that signal includes or comprises data.

The term "comprise" (and grammatical variations thereof) shall be construed broadly, as if followed by "without limitation". If A comprises B, then A includes B and may include other things.

The terms "cure" and "set" shall each be construed broadly. For example, each of these two terms includes to cure, set, solidify or harden.

The term "deposit" shall be construed broadly. For example, to "deposit" a first thing includes to spray, extrude, apply, splatter, apply, coat, pour, blow, shake, attach, affix, adhere, bond, attract, inject or deposit the first thing on, onto, against, or into a second thing.

The terms "e.g." and "such as" mean for example.

The fact that an "example" or multiple examples of something are given does not imply that they are the only instances of that thing. An example (or a group of examples) is merely a non-exhaustive and non-limiting illustration.

The term "fabricator" shall be construed broadly. For example, a fabricator may perform additive fabrication, subtractive fabrication, or both.

A "fill material" means a material cast or castable in a mold. A fill material may be a structural material.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "foam" shall be construed broadly, and may include a material in any state (e.g., solid, liquid or gas).

The term "heating element" includes an artificial heat source that heats by one or more of conduction, convection, radiation or induction. Also, the term "heating element" includes: (1) a resistor or any other resistive heating element; (2) any other device that converts electricity into heat by ohmic heating; (3) a hot stamp press or any other apparatus for applying heat and pressure; (4) an oven; (5) an inductive heater; (6) an artificial source of electromagnetic radiation, including a heat lamp, an artificial infrared light source, a laser, or an artificial source of microwave radiation; and (7) any heat pump, including any Peltier device or other thermoelectric heat pump.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

An "internal form" is a 3D object that is used for determining a shape of a second object, which second object is produced (or shaped) by depositing material on (or pressing material against) the outside of the internal form.

To deposit (including to spray) material "into free space" during a multi-cure period means to deposit the material into a region such that, at all relevant times for the multi-cure period, the material deposited is constrained, if at all, by constraining solid surface(s): (i) that consist of no more than one side of a rectangular cuboid (if the constraining surface(s) consist of only a side or sides of a rectangular cuboid), or (ii) that subtend no more than 2.1 pi steradians of a sphere centered at the centroid of the deposited material, when observed from that centroid (if the constraining surface(s) do not consist of only a side or sides of a rectangular cuboid). For purposes of the immediately preceding sentence: (a) the constraining surface(s) do not include the deposited material itself; (b) "all relevant times for the multi-cure period" means: (i) at all times immediately after any part of the material is deposited in the region during the multi-cure period, and (ii) if the material undergoes expansion before curing, at all times immediately after any part of the material deposited during the multi-cure period finishes this expansion; and (c) a "multi-cure period" is a time interval equal to five times the cure time for the deposited material.

The term "melt" shall be construed broadly. To "melt" includes to melt or soften by the application of heat.

"Multi-cure period" is defined in the text that defines "into free space".

The term "nozzle" shall be construed broadly. For example, the term "nozzle" includes any device configured to control the direction or characteristics of the flow of a fluid, as the fluid exits or enters an enclosed space (e.g., an enclosed chamber or pipe). For example, an outlet may be a "nozzle" even if the outlet does not accelerate fluids passing through the outlet. Also, for example, the term "nozzle" includes a compound nozzle.

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

The "pore size" of the foam means the average longest distance across a pore of the foam. For purposes of the immediately preceding sentence, in the case of an open-cell structured foam: (i) the open cells shall be treated as if they included walls that blocked interconnections between the otherwise open cells (which walls were configured to obtain the minimum "pore size"); and (ii) the foam shall not be treated as subdivided to increase the number of cells.

A foam is "sag-resistant" if, after a one inch thick layer of the foam has been sprayed against a flat vertical surface and adhered to that surface without any support other than by adhesion to that flat surface, the maximum vertical sag that occurs in the layer of foam before curing is 50%. For purposes of the immediately preceding sentence, the term "vertical" means parallel to the direction of acceleration exerted by the Earth's gravitational field on the foam. Clarification: Whether or not a foam is actually sprayed, in a particular application, in a one inch layer (or against a flat vertical surface or without any support other than adhesion to the surface) does not affect whether the foam is "sag-resistant". However, in order to test whether a particular foam is "sag resistant", one would need to spray it under the conditions set forth in the definition. (Of course, if a layer that was more than one inch thick satisfied the rest of the definition, then there would be no need to test with a one inch thick layer).

The term "soften" shall be construed broadly. To "soften" includes (1) to soften below a melting temperature and above a glass transition temperature, (2) to melt above a melting temperature, (3) to transition from a higher to a lower elastic modulus, (4) to transition from a higher to a lower viscosity, or (5) to otherwise soften.

The term "subtractive manufacturing" shall be construed broadly. For example, subtractive manufacturing includes (i) any removal of material by shear deformation or abrasion, (ii) any removal of matter from a first object caused by mechanical movement of one or more other objects relative to the first object, (iii) any removal of material by chemical dissolution or chemical degradation, or (iv) any other removal of material from a solid object. "Subtractive fabrication" includes, for example, cutting, carving, milling, lathing, drilling, boring, broaching, sawing, shaping, planing, turning, reaming, tapping, grinding, and abrading. Subtractive fabrication may occur, for example, by either rotary motion or linear motion of a part relative to the object being machined. "Subtractive fabrication" also includes all other methods of subtractive fabrication, including electrical discharge machining, electrochemical machining, electrochemical machining, electron beam machining, photochemical machining, ultrasonic machining, laser ablation, and laser cutting. A "subtractive fabrication tool" includes, for example (i) any tool that cuts material with a rotary bit, (ii) any milling tool, or (iii) any tool that removes material from another solid object. Also, for example, a "subtractive fabrication tool" includes any mill, lathe, drill, saw, blade, scraper, awl, broach, laser cutter, or any tool with a single cutting point or multiple cutting points, including at any scale. Also, for example, a "subtractive fabrication tool" includes any tool configured for subtractive fabrication.

"3D" means three-dimensional.

The term "3D printing" shall be construed broadly. For example, "3D printing" includes any additive fabrication process, in which successive layers of material are laid down in different shapes in accordance with a CAD model. Also, for example, "3D printing" includes subtractive fabrication, in which material is removed from an object in accordance with a CAD model.

The term "tool" shall be construed broadly. For example, the term "tool" includes (i) any physical item that can be used to achieve a goal, and (ii) any instrument, utensil, implement, machine, apparatus or equipment.

As used herein, an "unsupported span" means a portion of a structure, which portion is not supported by a column or other support directly underneath the portion. For example, the term "unsupported span" includes (i) a cantilever, (ii) an overhang, or (iii) a portion of a beam, where the beam is supported at its two ends but the portion spans over a chasm without any support directly underneath the portion.

"Wet" foam means foam that has not yet cured.

A list of multiple steps in a process does not imply, except to the extent that the context requires otherwise, that: (1) the steps occur in any particular order or sequence, including the order or sequence listed; (2) the steps occur only once; (3) the different steps occur the same number of times during the process, or (4) a particular step is applied to the same thing each time that the particular step occurs (for example, except to the extent that the context requires otherwise, a specific step that is described as applying to "a layer" may apply to a different layers in a layered object each time that this specific step occurs). For purposes of this grammatical paragraph, "list" includes "description" or "describe".

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the adjective "molten" shall be construed in like manner as the defined verb "melt". Or, for example, the adjective "softened" shall be construed in like manner as the defined verb "soften".

VARIATIONS

This invention may be implemented in many different ways. Here are some non-limiting examples.

This invention may be implemented as a method comprising, in combination: (a) using a nozzle to spray foam, layer by layer, to fabricate a fabricated object according to a CAD model; and (b) using a subtractive fabrication tool to remove material from the fabricated object according to a CAD model; wherein the fabricated object comprises a mold or an interior form. Furthermore: (1) the foam may be insulative and is left in place after the foam cures; (2) the fabricated object may comprise an interior form and fiber may be deposited on an exterior surface of the interior form; (3) the foam may be chemically setting; (4) at least one material property of the fabricated object may vary spatially within the fabricated object; (5) the mold or interior form may have an exterior surface and the exterior surface may be doubly-curved; (6) the removing of material with a subtractive fabrication tool may cause an exterior surface of the fabricated object to become smoother immediately after the removal than immediately before the removal; (7) structural elements may be embedded in walls of the mold; (8) the structural elements may be ties; (9) the ties may be configured to hold rebar in position; (10) during at least part of the spraying of foam, the foam may be sprayed into free space during a multi-cure period; and (11) the foam may be sag-resistant and the foam may be sprayed into free space during a multi-cure period to fabricate an unsupported span, which span comprises at least part of the fabricated object.

This invention may be implemented as a method comprising using a nozzle to spray foam, layer by layer, to fabricate a fabricated object according to a CAD model, wherein the fabricated object comprises a mold or an interior form. The foam may be insulative and may be left in place after the foam cures.

This invention may be implemented as apparatus comprising, in combination: (a) a nozzle, the nozzle being configured to spray foam, layer by layer, to fabricate a fabricated object according to a CAD model; and (b) a subtractive fabrication tool, the tool being configured to remove material from the fabricated object according to a CAD model; wherein the fabricated object comprises a mold or an interior form. Furthermore: (1) the foam may be insulative and may be left in place after the foam cures; (2) the foam may be sag-resistant and the foam may be sprayed into free space during the multi-cure period to fabricate an unsupported span, which span comprises at least part of the fabricated object; (3) the fabricated object may comprise an interior form and the apparatus may be further configured to deposit fiber on the exterior surface of the interior form; and (4) the nozzle may be configured to spray the foam into free space during a multi-cure period, while fabricating the fabricated object.

This invention may be implemented as an article of manufacture comprising a doubly curved foam object with a closed void inside the foam object, there being a longest distance across the closed void, which longest distance is more than 50 times longer than the pore size of foam comprising the foam object.

It is to be understood that the methods and apparatus that are described herein are merely illustrative applications of the principles of the invention. Numerous modifications may be made by those skilled in the art without departing from the scope of the invention.

What is claimed is:

1. An apparatus comprising:
   (a) a robotic arm;
   (b) a tool module; and
   (c) one or more computers;
   wherein
   (i) the robotic arm supports the tool module, which tool module comprises a nozzle and a subtractive fabrication tool, the nozzle and the subtractive fabrication tool being positioned in different locations within the tool module, and
   (ii) the one or more computers are programmed to control the robotic arm and tool module in such a way that
       (A) the nozzle performs spraying, which spraying comprises the nozzle spraying foam, layer by layer according to a CAD model, to fabricate walls of a mold configured to contain a casting material while the casting material cures,
       (B) the subtractive fabrication tool performs removal of material from the mold according to the CAD model, which removal of material comprises removing foam material sprayed from the nozzle, and
       (C) the robotic arm positions and orients the tool module in such a way that the nozzle and subtractive fabrication tool conduct the foam spraying and the removal of material, respectively, according to the CAD model.

2. The apparatus of claim 1, wherein the apparatus is mounted on a mobile platform.

3. The apparatus of claim 1, wherein the foam is a chemically setting foam.

4. The apparatus of claim 1, wherein the one or more computers are further programmed to control the spraying in such a way that at least one material property of the foam that comprises the mold varies spatially within the mold.

5. The apparatus of claim 1, wherein the one or more computers are further programmed to control the robotic arm and tool module in such a way that the spraying by the nozzle causes an exterior surface of the mold to be doubly-curved.

6. The apparatus of claim 1, wherein the one or more computers are further programmed to control the robotic arm and tool module in such a way that the removal of material causes an exterior surface of the mold to become smoother.

7. The apparatus of claim 1, wherein:
   (a) the foam is sag-resistant; and
   (b) the one or more computers are further programmed to cause the spraying to occur during a multi-cure period in which a span of a wall of the mold is formed, which span is, during the spraying, an unsupported span.

8. The apparatus of claim 1, wherein the one or more computers are further programmed to cause the spraying to occur in such a way that:
   (a) the spraying from the nozzle is in a flat fan pattern; and
   (b) rotating the nozzle varies width and thickness of one or more of the layers being deposited by the spraying.

9. The apparatus of claim 1, wherein the one or more computers are further programmed to cause the spraying to occur in such a way that the foam is sprayed upward from the nozzle and then adheres to one of the walls of the mold being fabricated.

10. An apparatus comprising:
    (a) a compound boom arm;
    (b) a robotic arm;
    (b) a tool module; and
    (d) one or more computers;
    wherein
    (i) the compound boom arm supports the robotic arm and tool module, which tool module comprises a nozzle and a subtractive fabrication tool, the nozzle and the subtractive fabrication tool being positioned in different locations within the tool module, and
    (ii) the one or more computers are programmed to control the compound boom arm, robotic arm and tool module in such a way that
       (A) the nozzle performs spraying, which spraying comprises the nozzle spraying foam, layer by layer according to a CAD model, to fabricate walls of a mold configured to contain a casting material while the casting material cures,
       (B) the subtractive fabrication tool performs removal of material from the mold according to the CAD model, which removal of material comprises removing foam material sprayed from the nozzle, and
       (C) the robotic arm positions and orients the tool module in such a way that the nozzle and subtractive fabrication tool conduct the foam spraying and the removal of material, respectively, according to the CAD model.

11. The apparatus of claim 10, wherein the apparatus is mounted on a mobile platform.

12. The apparatus of claim 10, wherein the foam is a chemically setting foam.

13. The apparatus of claim 10, wherein the one or more computers are further programmed to control the spraying in such a way that at least one material property of the foam that comprises the mold varies spatially within the mold.

14. The apparatus of claim 10, wherein the one or more computers are further programmed to control the robotic arm and tool module in such a way that the spraying by the nozzle causes an exterior surface of the mold to be doubly-curved.

15. The apparatus of claim 10, wherein the one or more computers are further programmed to control the robotic arm and tool module in such a way that the removal of material causes an exterior surface of the mold to become smoother.

16. The apparatus of claim 10, wherein:
    (a) the foam is sag-resistant; and
    (b) the one or more computers are further programmed to cause the spraying to occur during a multi-cure period in which a span of a wall of the mold is formed, which span is, during the spraying, an unsupported span.

17. The apparatus of claim 10, wherein the one or more computers are further programmed to cause the spraying to occur in such a way that:
    (a) the spraying from the nozzle is in a flat fan pattern; and
    (b) rotating the nozzle varies width and thickness of one or more of the layers being deposited by the spraying.

18. The apparatus of claim 10, wherein the one or more computers are further programmed to cause the spraying to occur in such a way that the foam is sprayed upward from the nozzle and then adheres to-one of the walls of the mold being fabricated.

* * * * *